(12) United States Patent  
Sinykin et al.

(10) Patent No.: US 9,994,069 B2  
(45) Date of Patent: Jun. 12, 2018

(54) METHODS OF MANUFACTURING PAINT ROLLER COVERS FROM A TUBULAR FABRIC SLEEVE

(71) Applicant: Seamless Technologies, LLC, Janesville, WI (US)

(72) Inventors: Daniel L. Sinykin, Bayside, WI (US); Randy Smith, Monona, WI (US); Scot Smith, DeForest, WI (US)

(73) Assignee: Seamless Technologies, LLC, Janesville, WI (US)

( * ) Notice: Subject to any disclaimer, the term of this patent is extended or adjusted under 35 U.S.C. 154(b) by 753 days.

(21) Appl. No.: 14/532,041

(22) Filed: Nov. 4, 2014

(65) Prior Publication Data

US 2015/0068938 A1 Mar. 12, 2015

Related U.S. Application Data

(63) Continuation of application No. 13/309,020, filed on Dec. 1, 2011, now Pat. No. 8,882,957, which is a (Continued)

(51) Int. Cl.
*B05C 17/02* (2006.01)
*B44D 3/12* (2006.01)
(Continued)

(52) U.S. Cl.
CPC .......... *B44D 3/125* (2013.01); *B05C 17/0207* (2013.01); *B29C 63/18* (2013.01);
(Continued)

(58) Field of Classification Search
CPC ................................................. B05C 17/0207
See application file for complete search history.

(56) References Cited

U.S. PATENT DOCUMENTS

| 676,668 A | 6/1901 | Patten |
| 1,152,110 A | 8/1915 | Lockwood |
| (Continued) | | |

FOREIGN PATENT DOCUMENTS

| DE | 19824405 A1 | 12/1999 |
| GB | 2236124 A | 3/1991 |
| KR | 1020010074645 A | 8/2001 |

*Primary Examiner* — Randall Chin  
(74) *Attorney, Agent, or Firm* — Reinhart Boerner Van Dueren s.c.

(57) ABSTRACT

A method of manufacturing paint roller covers is disclosed in which the paint roller covers are manufactured from a seamless segment of tubular paint roller cover fabric that is placed onto a cylindrical forming tube having a segment of bonding material temporarily secured on its outer surface under the segment of tubular paint roller cover fabric. The cylindrical forming tube is placed on a heated mandrel to apply heat thereto to cause the bonding material to bond to the interior of the segment of tubular paint roller cover fabric. The cylindrical forming tube is removed from the mandrel and cooled, and the segment of tubular paint roller cover fabric becomes secured to the bonding material to produce a semi-rigid paint roller cover segment. The semi-rigid paint roller cover segment may be finished into paint roller covers by cutting it into appropriately sized segments, combing and shearing the pile fabric to a desired length, beveling the edges of the paint roller covers, and vacuuming stray fibers from the paint roller covers.

19 Claims, 15 Drawing Sheets

Related U.S. Application Data continuation-in-part of application No. 12/100,050, filed on Apr. 9, 2008, now Pat. No. 8,858,750, which is a continuation-in-part of application No. 12/015,612, filed on Jan. 17, 2008, now Pat. No. 7,905,980, and a continuation-in-part of application No. 11/740,119, filed on Apr. 25, 2007, now Pat. No. 7,503,191.

(51) Int. Cl.
| | | |
|---|---|---|
| *B29C 63/18* | (2006.01) | |
| *B29C 63/48* | (2006.01) | |
| *D04B 1/02* | (2006.01) | |
| *B29C 63/10* | (2006.01) | |
| *B29L 31/32* | (2006.01) | |

(52) U.S. Cl.
CPC .............. *B29C 63/48* (2013.01); *D04B 1/025* (2013.01); *B29C 63/10* (2013.01); *B29C 2063/485* (2013.01); *B29C 2793/009* (2013.01); *B29L 2031/328* (2013.01)

(56) References Cited

U.S. PATENT DOCUMENTS

| | | |
|---|---|---|
| 1,660,538 A | 2/1928 | Whitney |
| 1,791,741 A | 2/1931 | Moore |
| 1,849,466 A | 3/1932 | Moore |
| 2,411,842 A | 12/1946 | Sinykin |
| 2,502,638 A | 4/1950 | Becht |
| 2,600,955 A | 6/1952 | Barnes et al. |
| 2,630,619 A | 3/1953 | Schmidt et al. |
| 2,704,877 A | 3/1955 | Schmidt |
| 2,737,702 A | 3/1956 | Schmidt et al. |
| 2,752,953 A | 7/1956 | Schmidt |
| 2,789,075 A | 4/1957 | Stahl |
| 2,806,803 A | 9/1957 | Thackara et al. |
| 2,920,372 A | 1/1960 | Sannipoli et al. |
| 2,944,588 A | 7/1960 | Sannipoli et al. |
| 2,948,200 A | 8/1960 | Westerbarkey |
| 3,010,867 A | 11/1961 | Sannipoli et al. |
| 3,126,306 A | 3/1964 | Sherman |
| 3,181,233 A | 5/1965 | Sannipoli et al. |
| 3,226,799 A | 1/1966 | Grodberg et al. |
| 3,226,952 A | 1/1966 | Cassady |
| 3,299,672 A | 1/1967 | Schmidt |
| 3,301,734 A | 1/1967 | Britton et al. |
| 3,366,719 A | 1/1968 | Lueders |
| 3,376,180 A | 4/1968 | Larson et al. |
| 3,404,203 A | 10/1968 | Donald |
| 3,429,522 A | 2/1969 | Cunningham et al. |
| 3,430,543 A | 3/1969 | Cunningham |
| 3,453,163 A | 7/1969 | Mills et al. |
| 3,457,130 A | 7/1969 | Morrison |
| 3,518,970 A | 7/1970 | Burns et al. |
| 3,607,492 A | 9/1971 | Keith et al. |
| 3,620,869 A | 11/1971 | Stump et al. |
| 3,700,520 A | 10/1972 | Hielema |
| 3,732,135 A | 5/1973 | Ernst et al. |
| 3,761,335 A | 9/1973 | Cichoski et al. |
| 3,853,680 A | 12/1974 | Daniel |
| 3,894,407 A | 7/1975 | Clingan et al. |
| 3,894,409 A | 7/1975 | Clingan et al. |
| 3,896,637 A | 7/1975 | Thore |
| 3,905,853 A | 9/1975 | Stent |
| 3,960,624 A | 6/1976 | Erlandson |
| 4,010,054 A | 3/1977 | Bradt |
| 4,078,957 A | 3/1978 | Bradt |
| 4,112,565 A | 9/1978 | Sailas |
| 4,191,792 A | 3/1980 | Janssen |
| 4,192,697 A | 3/1980 | Parker et al. |
| 4,236,286 A | 12/1980 | Abler et al. |
| 4,245,487 A | 1/1981 | Schaab et al. |
| 4,378,267 A | 3/1983 | Saito |
| 4,395,869 A | 8/1983 | Priaroggia et al. |
| 4,415,611 A | 11/1983 | Yamagata et al. |
| 4,466,151 A | 8/1984 | Barch et al. |
| 4,513,042 A | 4/1985 | Lumb |
| 4,532,780 A | 8/1985 | Tilson et al. |
| 4,546,020 A | 10/1985 | Sakai et al. |
| 4,592,213 A | 6/1986 | Tilson et al. |
| 4,692,975 A | 9/1987 | Garcia |
| 4,798,748 A | 1/1989 | Kitamura et al. |
| 5,051,586 A | 9/1991 | Sabreen |
| 5,108,780 A | 4/1992 | Pitt et al. |
| 5,137,595 A | 8/1992 | Garcia |
| 5,195,242 A | 3/1993 | Sekar |
| 5,206,968 A | 5/1993 | Bower et al. |
| 5,273,604 A | 12/1993 | Alvarez Garcia |
| 5,294,276 A | 3/1994 | Linn et al. |
| 5,339,484 A | 8/1994 | Polzin et al. |
| 5,397,414 A | 3/1995 | Garcia et al. |
| 5,398,409 A | 3/1995 | Sekar |
| 5,431,029 A | 7/1995 | Kuhrau et al. |
| 5,468,207 A | 11/1995 | Bower et al. |
| 5,537,745 A | 7/1996 | Musch et al. |
| 5,546,768 A | 8/1996 | Kuhrau et al. |
| 5,572,790 A | 11/1996 | Sekar |
| 5,577,402 A | 11/1996 | Kuhrau et al. |
| 5,614,047 A | 3/1997 | Garcia |
| RE35,526 E | 6/1997 | Alvarez Garcia |
| 5,685,176 A | 11/1997 | Kuhrau et al. |
| 5,694,688 A | 12/1997 | Musch et al. |
| 5,759,329 A | 6/1998 | Krause et al. |
| 5,855,715 A | 1/1999 | Langford et al. |
| 5,862,591 A | 1/1999 | Kulkaski |
| 5,874,032 A | 2/1999 | Zdrahala et al. |
| 6,016,670 A | 1/2000 | Kuhrau et al. |
| 6,019,934 A | 2/2000 | Schulte |
| 6,145,196 A | 11/2000 | Ripstein |
| 6,151,920 A | 11/2000 | Schindler et al. |
| 6,151,922 A | 11/2000 | Shimasaki |
| 6,159,134 A | 12/2000 | Sekar |
| 6,159,320 A | 12/2000 | Tams et al. |
| 6,203,648 B1 | 3/2001 | Barton et al. |
| 6,254,710 B1 | 7/2001 | Sekar |
| 6,324,717 B1 | 12/2001 | Sekar |
| 6,502,779 B1 | 1/2003 | Jelinek et al. |
| 6,615,490 B2 | 9/2003 | Polzin |
| 6,660,118 B2 | 12/2003 | Tams et al. |
| 6,685,121 B1 | 2/2004 | Jelinek et al. |
| 6,766,668 B2 | 7/2004 | Sinykin |
| 6,902,131 B1 | 6/2005 | Jelinek et al. |
| 6,918,552 B2 | 7/2005 | Jelinek et al. |
| 6,929,203 B1 | 8/2005 | Jelinek et al. |
| 6,993,941 B2 | 2/2006 | Yamaguchi |
| 7,503,190 B1 | 3/2009 | Knight, Sr. et al. |
| 7,503,191 B2 | 3/2009 | Knight et al. |
| 2001/0036513 A1 | 11/2001 | Capoccia |
| 2001/0045014 A1* | 11/2001 | Polzin ................ B05C 17/0207 29/895.21 |
| 2002/0042331 A1 | 2/2002 | Fortner et al. |
| 2002/0066521 A1 | 6/2002 | Sekar |
| 2002/0091051 A1 | 7/2002 | Sekar |
| 2002/0104358 A1 | 8/2002 | Hart |
| 2002/0112810 A1 | 8/2002 | Polzin et al. |
| 2003/0213083 A1 | 11/2003 | Yamaguchi |
| 2006/0216459 A1* | 9/2006 | Kohlruss ............. A46B 13/006 428/88 |
| 2007/0056132 A1 | 3/2007 | Yamaguchi et al. |
| 2008/0263802 A1 | 10/2008 | Knight et al. |
| 2008/0264110 A1 | 10/2008 | Sinykin |
| 2008/0265468 A1 | 10/2008 | Sinykin |
| 2008/0269033 A1 | 10/2008 | Sinykin |

* cited by examiner

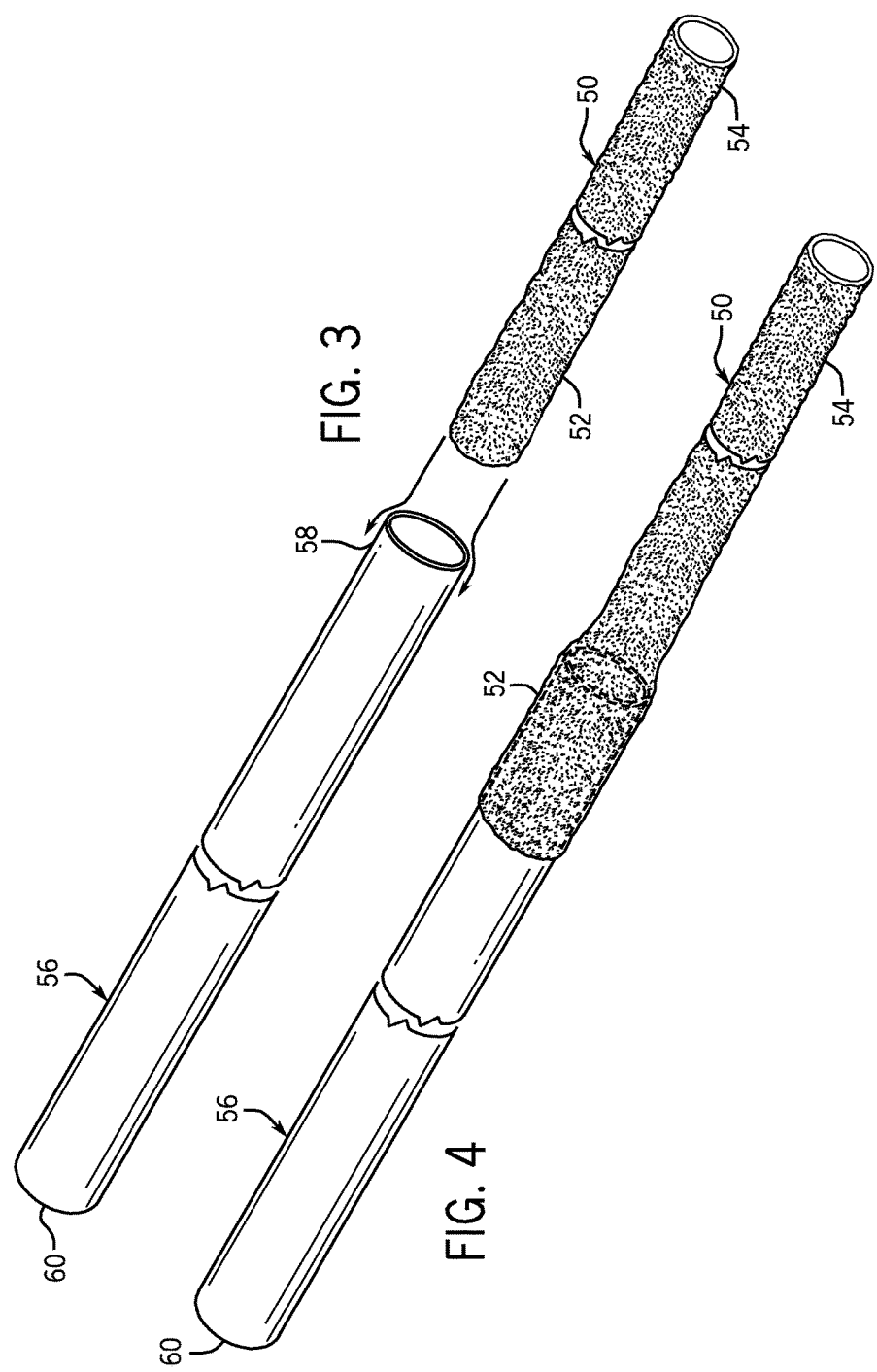

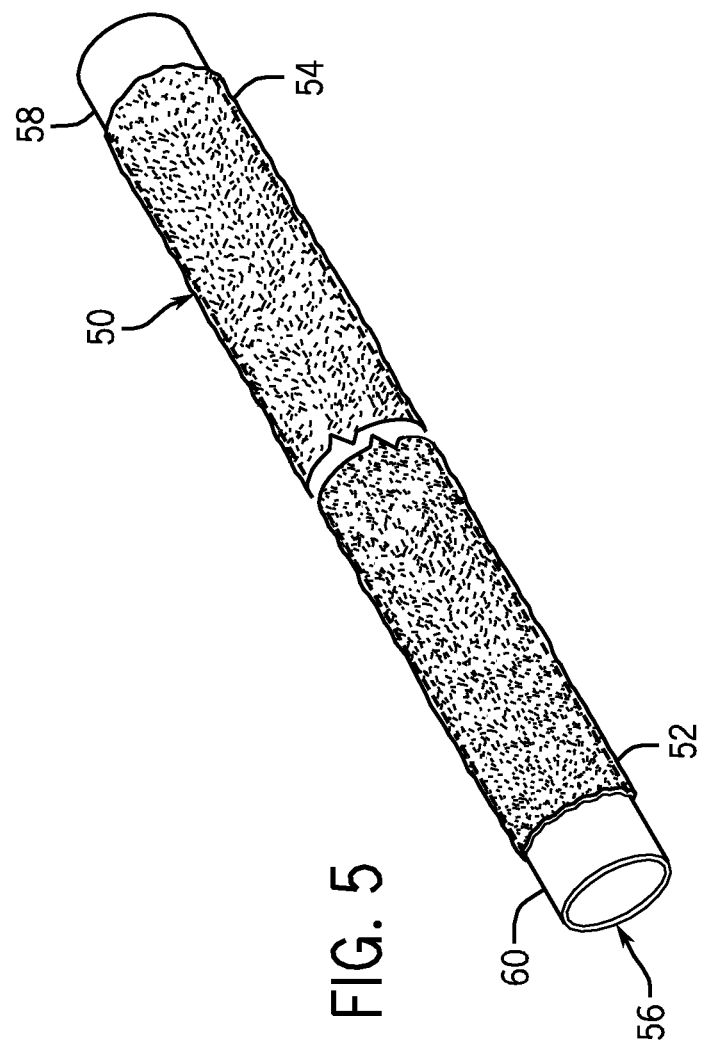

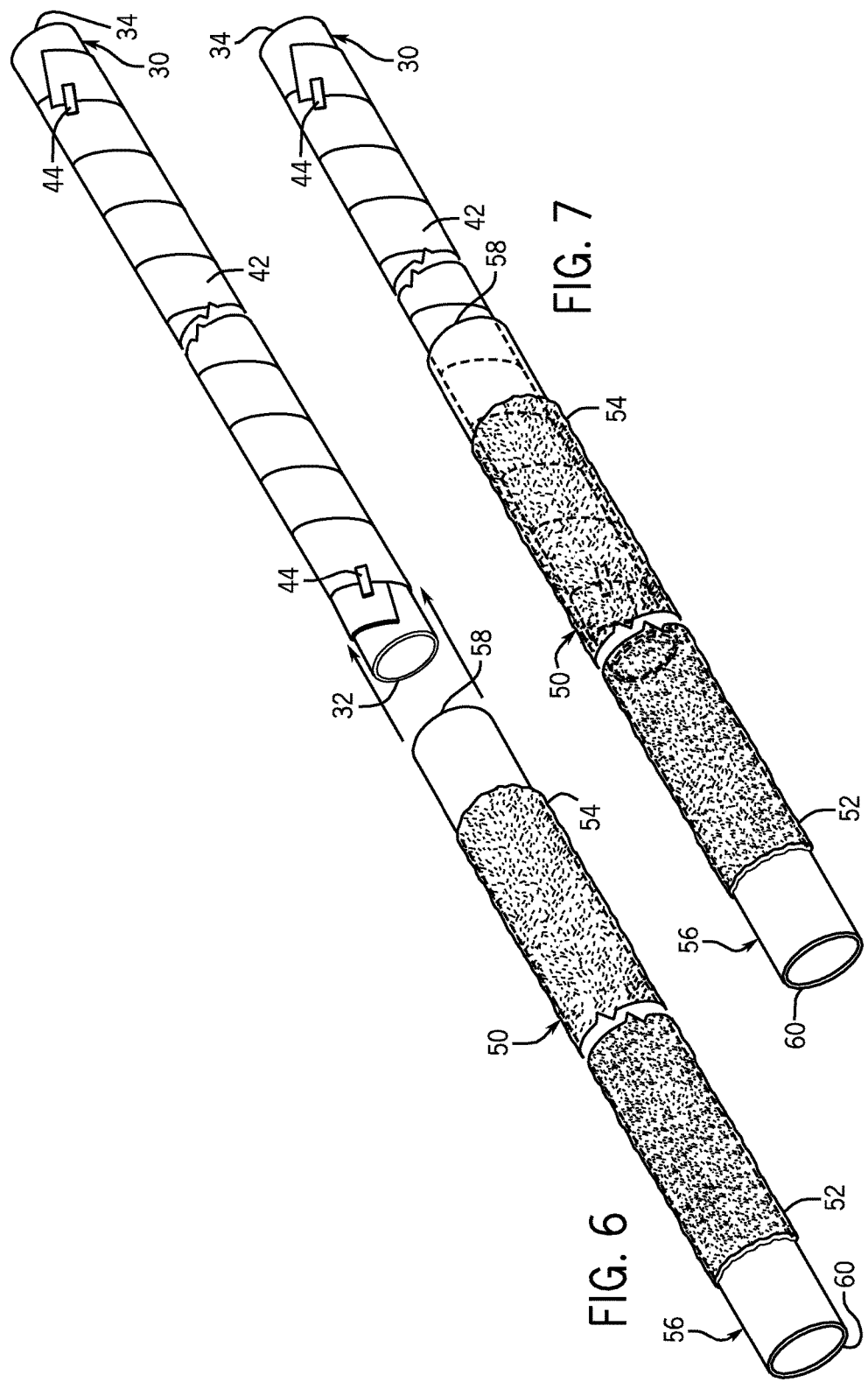

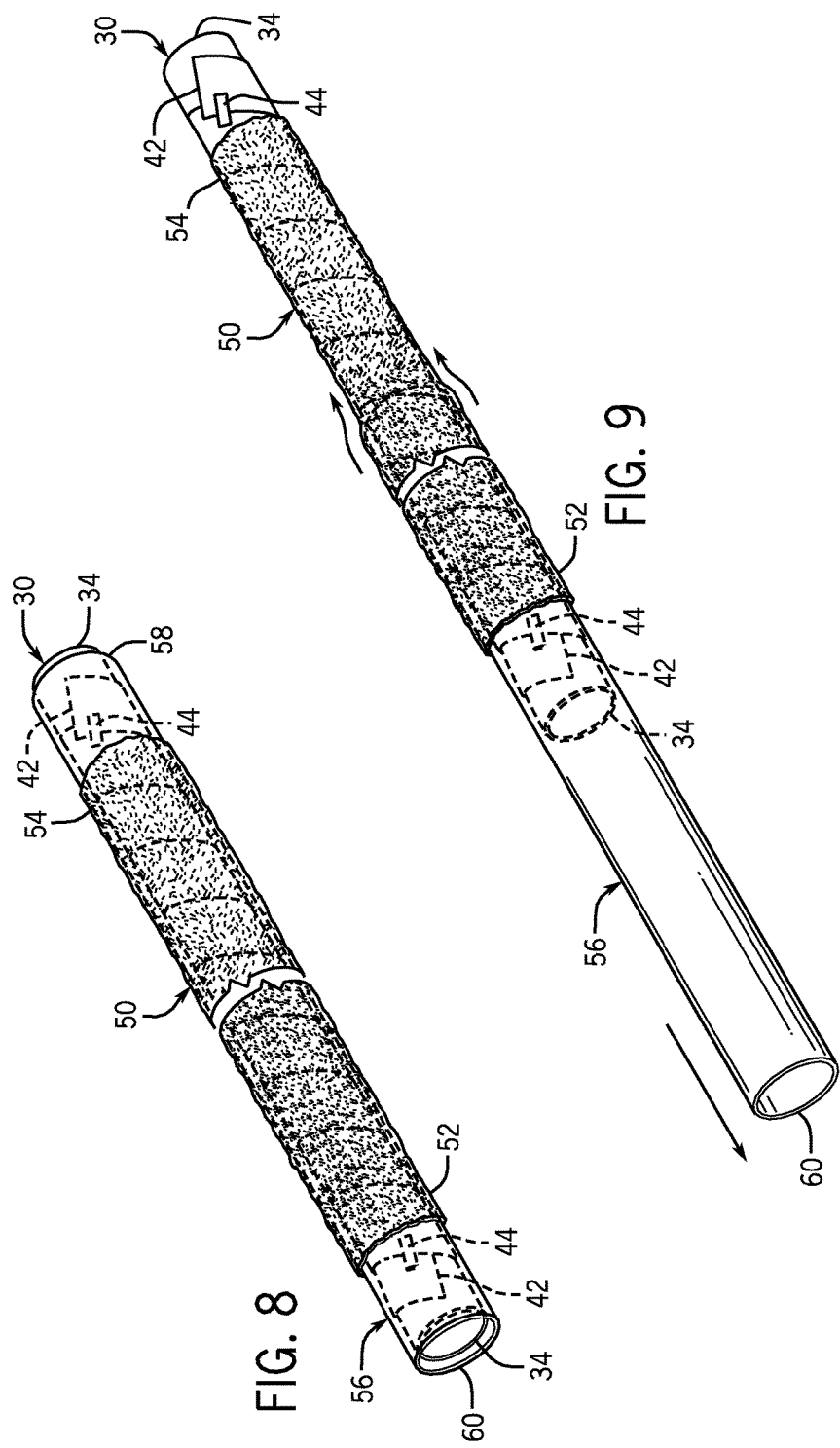

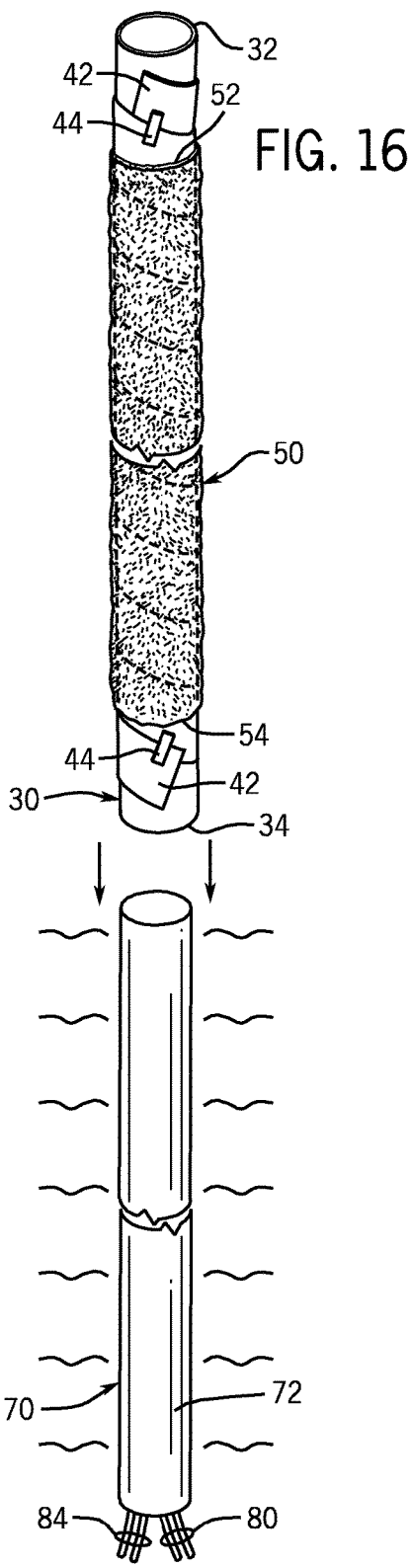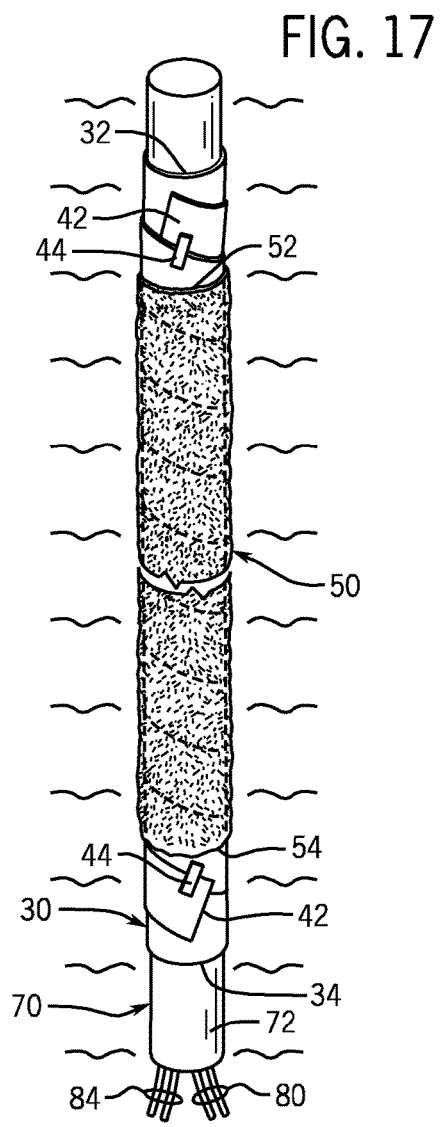

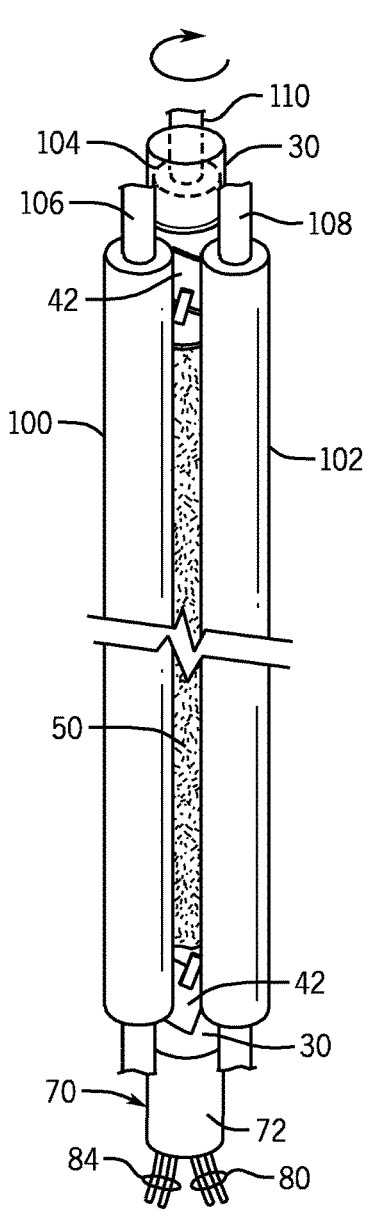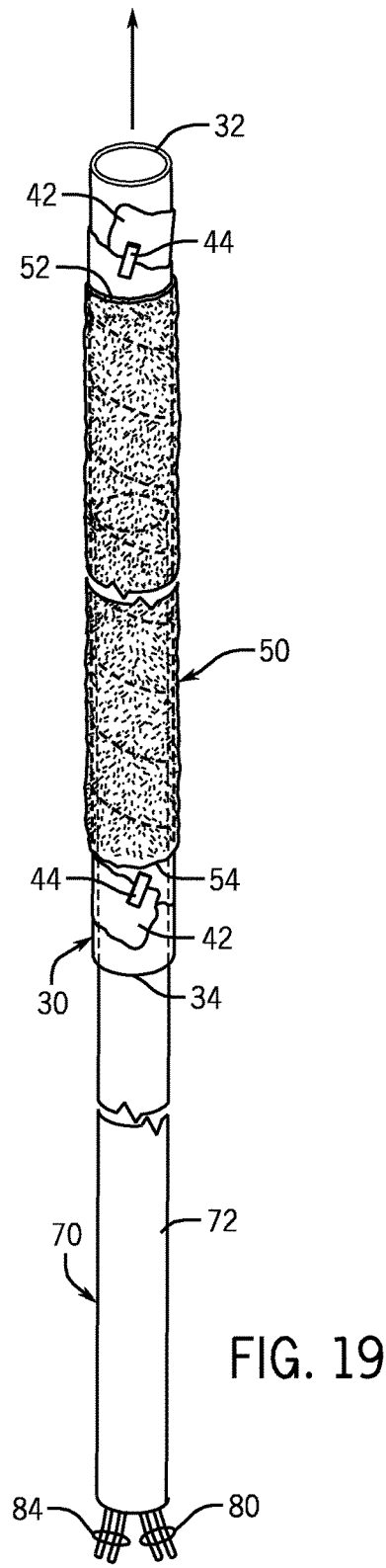
FIG. 18
FIG. 19

METHODS OF MANUFACTURING PAINT ROLLER COVERS FROM A TUBULAR FABRIC SLEEVE

IDENTIFICATION OF RELATED APPLICATION

This patent application is a continuation of U.S. patent application Ser. No. 13/309,020, filed on Dec. 1, 2011, now U.S. Pat. No. 8,882,957, granted on Nov. 11, 2014, entitled "Method of Manufacturing Paint Roller Covers From a Tubular Fabric Sleeve," which is a continuation-in-part of U.S. patent application Ser. No. 12/100,050, filed on Apr. 9, 2008, now U.S. Pat. No. 8,858,750, granted on Oct. 14, 2014, entitled "Method of Manufacturing Paint Roller Covers From a Tubular Fabric Sleeve," which itself is both a continuation-in-part of U.S. patent application Ser. No. 12/015,612, filed on Jan. 17, 2008, now U.S. Pat. No. 7,905,980, granted on Mar. 15, 2011, entitled "Method of Manufacturing Paint Roller Covers From a Tubular Fabric Sleeve" and a continuation-in-part of U.S. patent application Ser. No. 11/740,119, filed on Apr. 25, 2007, now U.S. Pat. No. 7,503,191, granted on Mar. 17, 2009, entitled "Tubular Sliver Knit Fabric for Paint Roller Covers," all four of which patent applications and patents are assigned to the assignee of the present invention, which patent applications and which patents are hereby incorporated herein by reference in their entirety.

BACKGROUND OF THE INVENTION

Field of the Invention

The present invention relates generally to the manufacture of paint roller covers, and more particularly to methods of manufacturing paint roller covers from a seamless, tubular fabric sleeve which is reinforced by a heat-activated thermal bonding material that is thermally secured to the inside of the backing of the tubular fabric sleeve.

The two inventions which have had the greatest impact on paint application are the invention of the paint roller in the 1930's and the development of water-based paint in the late 1940's. While water-based paints are easy to mix, apply, and clean up, there is little doubt that the paint roller has been the greatest single time saving factor in the paint application process, allowing large surfaces to be painted with a uniform coat of paint quickly and easily. Typically, paint rollers are comprised of two components, namely a handle assembly and a paint roller cover for installation onto the handle assembly.

The handle assembly consists of a grip member having a generally L-shaped metal frame extending therefrom, with the free end of the metal frame having a rotatable support for a paint roller cover mounted thereon. The paint roller cover consists of a thin, hollow cylindrical core which fits upon the rotatable support of the handle, with a plush pile fabric being secured to the outer diameter of the paint roller cover. The core may be made of either cardboard or plastic material, with which material is used for the core generally being determined based upon the selling price of the paint roller cover. The pile fabric is traditionally applied as a strip which is helically wound onto the outer surface of the core with adjacent windings of the fabric strip being located close adjacent each other to provide the appearance of a single continuous pile fabric covering on the core.

Typically, the pile fabric is a dense knitted pile fabric, which may be knitted from natural fibers such as wool or mohair, synthetic fibers such as polyester, acrylic, nylon, or rayon, or from a blend of natural and synthetic fibers. The knitting is typically performed on a circular sliver knitting machine, which produces a tubular knitted base material with a knit-in pile in tubular segments which are approximately fifty-eight inches (1473 millimeters) in circumference by thirty to fifty yards (25 meters to 41.8 meters) long (depending on fabric weight).

Generally, sliver knitting is a knitting process which locks individual pile fibers directly into a lightweight knit backing or base material in a manner wherein the pile fibers extend from one side of the knit base material. The knit base material itself is made from yarn, which may be knit in a single jersey circular knitting process on a circular knitting machine, with closely packed U-shaped tufts of the fibers being woven into the knit base material which anchors them in the completed pile fabric. The free ends of the fibers extend from one side of the knit base material to provide a deep pile face. The knit base material is typically made of synthetic yarns, with the pile being made of a desired natural or synthetic fiber, or a blend of different fibers.

Such fabrics are illustrated, for example, in U.S. Pat. No. 1,791,741, to Moore, U.S. Pat. No. 2,737,702, to Schmidt et al., U.S. Pat. No. 3,226,952, to Cassady, U.S. Pat. No. 3,853,680, to Daniel, U.S. Pat. No. 3,894,409, to Clingan et al., U.S. Pat. No. 4,236,286, to Abler et al., U.S. Pat. No. 4,513,042, to Lumb, and U.S. Pat. No. 6,766,668, to Sinykin, all of which patents are hereby incorporated herein by reference. Sliver knit high pile fabrics have been widely used for many years in the manufacture of imitation fur fabrics, and also have found use, for example, as linings for overcoats and footwear, as coverings for stuffed toys and floors, in applications in pet beds, case liners, boot and slipper liners, medical pads, and blankets, and, of course, as coverings for paint roller covers.

The components of the knitted fabric are a yarn, which is used to knit the fabric's knit base material, and fibers which are supplied in a "sliver" rope, which consists of fibers which are all longitudinally oriented in a rope which is typically less than three inches (76 millimeters) in diameter. The fibers are loose fibers of either a single type or a uniform blend of multiple types of fibers. The fiber mix will determine the performance, density, texture, weight, patterning, and color of the finished pile fabric.

The fibers are typically blown together in an air chamber to blend them, and then are carded in carding machines that "comb" the fibers to align them in parallel with each other. The fibers are then gathered into a soft, thick rope which is called "sliver" (which is the derivation for the term "sliver knit") or "roving." The yarn and the sliver are supplied to the circular knitting machine, which typically has eighteen heads and produces a tubular knit pile fabric which is approximately fifty-eight inches (1473 millimeters) in circumference. (Thus, when the tubular knit pile fabric is slit longitudinally, the fabric is approximately fifty-eight inches (1473 millimeters) wide.)

Such knitting machines are well known in the art, and are illustrated in U.S. Pat. No. 3,894,407, to Clingan et al., U.S. Pat. No. 3,896,637, to Thore, U.S. Pat. Nos. 4,532,780 and 4,592,213, both to Tilson et al., U.S. Pat. Nos. 5,431,029, 5,546,768, 5,577,402, 5,685,176, and 6,016,670, all to Kukrau et al., and U.S. Pat. No. 6,151,920, to Schindler et al., all of which patents are hereby incorporated herein by reference. Examples of commercial versions of such knitting machines are the Model SK-18 II Sliver Knitter and the Model SK-18J II Sliver Knitter which are available from Mayer Industries, Inc. of Orangeburg, S.C.

The first commercial circular sliver knitting machine had seven heads, and commercially-available circular knitting machines today have between seven and eighteen heads. Eighteen head knitting machines have upwards of one thousand needles, and produce tubular knitted segments that are approximately nineteen inches (483 millimeters) in diameter (fifty-eight inches (1473 millimeters) in circumference). All of these circular sliver knitting machines produce tubular knitted pile fabric segments having the pile located on the inside. Such circular sliver knitting machines are incapable of either producing tubular knitted pile fabric segments having the pile on the outside or small diameter tubular knitted pile fabric segments.

Following the manufacture of the tubular knitted pile segments on a circular sliver knitting machine, the tubular knitted pile segments are slit longitudinally to produce extended knitted pile segments of fabric which are typically fifty-eight inches (1473 millimeters) wide by thirty yards (27.43 meters) to fifty yards (45.72 meters) long. These extended knitted pile segments of fabric are then tensioned longitudinally and transversely, stretched to a 60 inch (1524 millimeter) width or greater to guarantee the proper number of two and seven-eighth inch (73 millimeter) strips, and back coated (on the non-pile side of the knit base material) with a stabilized coating composition such as a clear acrylic polymer. The coating composition which is coated onto the non-pile side of the knit base material is then processed, typically by heat, to stabilize the coated, extended knitted pile segment. The heating operation dries and bonds the coating composition to the knit base material, producing a fabric which is essentially lint-free.

The coated, extended knitted pile segment can then be subjected to a shearing operation to achieve a uniform pile length, with the sheared fibers being removed by vacuum, electrostatically, or by any other known removal technique. The pile density, the nap length, and the stiffness of the fibers are varied based upon custom specifications and the particular characteristics of the paint roller cover that are desired.

The sheared, coated, extended knitted pile segment is then slit into a plurality of two and seven-eighths inch (73 millimeter) wide knitted pile fabric strips, of which there are typically twenty for a sixty inch (1524 millimeter) wide fabric segment. Following this slitting operation, the strips must be vacuumed to remove stray fibers and lint. The knitted pile fabric strips are rolled onto a core to produce twenty rolls of knitted pile fabric strips, each of which is thirty to fifty yards long. These rolls of knitted pile fabric strips may then be shipped to a paint roller cover manufacturer. Alternately, a plurality of standard lengths of the fabric may be seamed together to produce an extended length fabric strip which may be helically wound in consecutive rows upon a core as taught in U.S. Pat. No. 6,502,779, U.S. Pat. No. 6,685,121, U.S. Pat. No. 6,902,131, U.S. Pat. No. 6,918,552, and U.S. Pat. No. 6,929,203, all to Jelinek et al., all of which patents are hereby incorporated herein by reference.

Both the standard length rolls of knitted pile fabric strips and the rolls of extended length knitted pile fabric strips have substantial material costs and labor costs that are incurred in the manufacturing process after the circular knitting process. The material costs include the cost of the coating material, losses due to fly (fly are extra fibers that come loose from the knitted pile fabric), losses during the cutting of the sixty inch (1524 millimeter) wide fabric segment into twenty knitted pile fabric strips, and seam losses throughout the operation. The labor costs include the costs to perform the coating process, the brushing, the second pass shearing, and all of the finishing steps within the traditional sliver knit operation including slitting and continuously coiling the fabric slits.

Paint roller covers are manufactured by using a hollow cylindrical core made of cardboard or thermoplastic material which has the knitted pile fabric strip helically wound around the core. During the manufacture of paint roller covers, the knitted pile fabric strips are secured to the core either by using adhesive or epoxy, or by thermally bonding the knitted pile fabric strip in place on a thermoplastic core. For examples of these manufacturing processes see U.S. Pat. No. 4,692,975, to Garcia (the "'975 patent"), U.S. Pat. No. 5,572,790, to Sekar (the "'790 patent"), and U.S. Pat. No. 6,159,320, to Tams et al. (the "'320 patent"), each of which are hereby incorporated by reference.

The '975 patent uses a core that is cut from preformed thermoplastic (e.g., polypropylene) tubular stock. The core is mounted on a rotating spindle, and a movable carriage mounted at an angle to the spindle feeds a continuous strip of knitted pile fabric onto the core, with the carriage moving parallel to the spindle in timed relation to its rotation so that the knitted pile fabric strip is wound on the plastic core in a tight helix. Also mounted to the movable carriage is a heat source for heat softening the thermoplastic core just in advance of the point where the knitted pile fabric strip is applied to the thermoplastic core, such that the knitted pile fabric is heat bonded to the thermoplastic core as it is wound thereon. The bond formed between the knitted pile fabric and the thermoplastic core is a strong one not subject to separation from exposure to paint solvents.

The '790 patent uses a core that is formed from a strip (or multiple strips) of thermoplastic material that is (are) helically wound about a stationary mandrel. Alternately, the core may be formed by applying liquefied thermoplastic material to a drive belt which transfers the thermoplastic material to the mandrel. A layer of adhesive is then applied to the outer surface of the core, and the knitted pile fabric strip is applied to the core by helically winding the knitted pile fabric strip onto the core. Alternately, the paint roller cover may instead be made by bonding, in a single step, a knitted pile fabric strip to a wound strip of thermoplastic material that is wrapped about the mandrel.

The '320 patent extrudes a cylindrical plastic core through a rotating extruder head that is cooled, with the outer surface of the core then being plasma treated. The knitted pile fabric strip is secured onto the plasma treated outer surface of the core by extruding thin films of first and second epoxy resin subcomponents onto the outer surface of the core as it is extruded, cooled, and plasma treated in a continuous process.

Other variations are also known, particularly in technologies relating to manufacturing pile fabric suitable for use on paint roller covers. For example, instead of using knitted pile fabric, woven pile fabric can be substituted. Woven pile fabric consists of three yarns—a knit base material or warp yarn, a filling or weft yarn, and a pile yarn. The threads of warp yarn are held taut and in a parallel array on a loom, and the threads of weft yarn are woven across the threads of warp yarn in an over/under sequence orthogonal to the threads of warp yarn, with threads of pile yarn being woven into the weave of warp and weft yarns such that the threads of pile yarn extend essentially perpendicularly from one side of the fabric. Such woven pile fabric may be processed in a manner similar to that described above with regard to the processing of knitted pile segments of fabric to produce strips of woven pile fabric that can be helically wound onto paint roller cover cores.

However, all paint roller covers manufactured using the methods described above have a seam. As the strips of fabric are helically wound around the cores, the fabric strips wrap contiguously around the core, thereby creating a helical seam that is located throughout the cover. The seam inevitably produces a less than optimal paint roller cover since a seam can interfere with the uniform application of paint from the paint roller cover. The helical winding process of manufacturing a paint roller cover requires careful attention to contiguous winding. Errors resulting in overlapped fabric or gaps in the contiguous winding process often occur, resulting in increased scrap or marketing poor quality covers. Such seams have the potential, particularly with short nap paint roller covers, to produce a seam mark or stippling effect on the surface being painted, particularly if the paint being applied combines with the seams to produce a more pronounced defective characteristic in the surface being painted.

An examination of prior technology in the paint roller cover arts reveals that this problem has been recognized in the past, with several solutions that have been proposed to deal with the challenge presented by the presence of seams in paint roller covers. The first of these, U.S. Pat. No. 2,600,955, to Barnes et al., which patent is hereby incorporated herein by reference, discloses a paint roller cover made from a segment of canvas tubing that has yarn loops sewn therethrough, with the ends of the loops on the outside of the segment of the canvas tubing being cut. This approach is certainly far too expensive to represent a viable solution, and would not compare well to currently commercially available paint roller covers in the quality of the paint coat that could be applied.

Another approach is shown in U.S. Pat. No. 2,920,372, U.S. Pat. No. 2,944,588, and U.S. Pat. No. 3,010,867, all to Sannipoli et al., which patents are hereby incorporated herein by reference, which patents are related and disclose the use of a tubular knitted pile fabric manufactured on an apparatus disclosed in U.S. Pat. No. 1,849,466, to Moore, which patent is hereby incorporated herein by reference. The apparatus disclosed in Moore, which is hand operated, was stated in the Sannipoli et al. patents to be capable of manufacturing a seamless tubular knitted sleeve in which the pile is located on the interior of the sleeve, thereby requiring that the sleeve be inverted prior to mounting it on a core to form a paint roller cover. As such, the apparatus disclosed in Moore is incapable of manufacturing a knitted sleeve in which the pile is located on the exterior of the sleeve.

The Sannipoli et al. patents inverted the tubular knitted sleeve by positioning it within a hollow tube and pulling one end of the tubular knitted sleeve around the end of the tube and pushing successive portions of the tubular knitted sleeve along the outside of the tube. The Arnold Schmidt '877 patent (which failed to disclose how it inverted the knitted sleeve with the pile on the interior thereof) disclosed a machine for treating and shearing inverted tubular knitted sleeves, and the Arnold Schmidt '953 patent disclosed using the inverted, treated, and sheared tubular knitted sleeves by stretching them and pulling them over a tube or shell to form a paint roller.

The problem that has prevented the inventions of the Arnold Schmidt patents and the Sannipoli et al. patents from being either practical or commercially successful is that the process of inverting a tubular knitted sleeve having the pile on the interior of the sleeve inevitably damages the fabric of the tubular knitted sleeve. When the fabric is inverted, the material of the fabric is deformed due to stretching that occurs during the process of inverting the tubular knitted sleeve. This deformation tends to increase the diameter of the tubular knitted sleeve, thus requiring it to be stretched lengthwise to restore it to its former diameter. Not only is this process difficult and expensive, but it also results in variable density of the fabric as well as introducing the prospect of adhesive or thermoplastic bleed-through within the stitches. Such problems will result in unacceptable product quality in paint roller covers made from this type of fabric.

It has been determined that the inverting approach taught by the Sannipoli et al. patents and useable by the Arnold Schmidt patents has three drawbacks that make it impracticable. The first drawback of the inverting method is that it requires a high degree of manual operation in that it requires cutting of the tubular knitted sleeves to size and placement of the tubular knitted sleeves into the tubes of the inverting machine. The second drawback of the Sannipoli et al. method is that only relatively short length tubular knitted sleeves representing a single paint roller cover (typically nine inches (229 millimeters)) can be processed at a time, which makes the method inherently unsuitable for mass production.

The third, and by far the most serious, drawback of the Sannipoli et al. method is that the process of inverting the tubular knitted sleeves inevitably results in stretching the tubular knitted sleeves so that they will not snugly fit on the paint roller cover cores, potentially creating creases in a high percentage of them when they are adhesively secured to the paint roller cover cores. This results in an unacceptably high percentage of them being defective and necessitating them being scrapped, resulting in an unacceptably high scrap cost. Predictably, the inventions taught in the Sannipoli et al. patents and the Arnold Schmidt patents have never found commercial acceptance due to these serious disadvantages.

The above-incorporated by reference U.S. patent application Ser. No. 11/740,119, now U.S. Pat. No. 7,503,191, discloses a tubular sliver knitted pile fabric which is manufactured with the sliver pile side facing outwardly rather than inwardly and with a diameter suitable for mounting on a paint roller cover core in a seamless manner. The above-incorporated by reference U.S. patent application Ser. No. 12/116,022, now U.S. Pat. No. 7,748,241, discloses a tubular knit fabric which is manufactured with a cut pile made of yarn which pile faces outwardly rather than inwardly and with a diameter suitable for mounting on a paint roller cover core in a seamless manner.

The above-incorporated by reference U.S. patent application Ser. No. 12/015,612, now U.S. Pat. No. 7,905,980, discloses a method of manufacturing paint roller covers from the tubular knitted pile fabric sleeve by initially placing the tubular knitted pile fabric sleeve upon the outside of a thin hollow cylindrical mounting tube, providing an adhesive bonding material on the exterior surface of a core member, and inserting the core member into the interior of the mounting tube. By withdrawing the mounting tube from the knitted pile fabric sleeve while maintaining the respective positions of the knitted pile fabric sleeve and the core member, the knitted pile fabric sleeve is installed onto the exterior surface of the core member and retained thereupon by the adhesive bonding material. The pile fabric covered core member is then finished into paint roller covers by cutting it to a desired size, combing and shearing the pile fabric to a desired length, beveling the edges of the paint roller covers, and vacuuming stray fibers from the paint roller covers.

The above-incorporated by reference U.S. patent application Ser. No. 12/116,022, now U.S. Pat. No. 7,748,241, discloses a method of manufacturing paint roller covers from either of the tubular knitted pile fabric sleeves described above by providing an adhesive bonding material that has a relatively non-tacky outer surface on the exterior surface the outside of the core member. The knitted pile fabric sleeve is installed onto the exterior surface of the core member over the adhesive bonding material. The adhesive bonding material is then rendered tacky, whereupon the knitted pile fabric sleeve becomes adhesively secured by the adhesive bonding material to the exterior surface of the core member. The pile fabric covered core member may be finished into paint roller covers by combing and shearing the pile fabric to a desired length, beveling the edges of the paint roller covers, and vacuuming stray fibers from the paint roller covers.

While these methods of installing tubular knitted pile fabric sleeves onto core members have been found to be quite satisfactory, it is desirable to provide still other methods by which a paint roller cover may be manufactured from a tubular pile fabric. It is further desirable that the knitted pile fabric need not be stretched during the manufacturing process, and that the manufacturing process ensure that the knitted pile fabric will not have any wrinkles or other surface defects introduced therein during the manufacturing process. It is also desirable that the tubular pile fabric, which is manufactured with the pile side out, need not be inverted during the process of manufacturing a paint roller cover from the tubular pile fabric.

It is highly desirable that the manufacturing method results in an acceptable pile which extends from an acceptably rigid core that can be installed on and used with any conventional paint roller frame. In order to facilitate the mass manufacture of paint roller covers, it is also desirable that the method facilitate either the manufacture of a paint roller cover of a desired finished length, or the manufacture of an extended length segment from which can be cut segments of any desired size for finishing as paint roller covers. It is also desirable that both tubular sliver knitted pile fabric and tubular knitted yarn cut pile fabric as well as a number of different backing materials can be used in the manufacture of paint roller covers.

The method used to manufacture a paint roller cover from the tubular pile fabric must result in a construction which is both durable and long lasting, and which, when accomplished, should yield a paint roller cover of superior quality. In order to enhance the market appeal of the method of the present invention, it should also minimize the cost of manufacture of paint roller covers when compared to conventional methods of manufacturing paint roller covers to thereby afford it the broadest possible market. Finally, it is also desirable that all of the aforesaid advantages and aspirations of the paint roller cover manufacturing method of the present invention be achieved without incurring any substantial relative disadvantage.

SUMMARY OF THE INVENTION

The disadvantages and limitations of the background art discussed above are overcome by the present invention. With this invention, a method of manufacturing paint roller covers is provided which paint roller covers are manufactured from a seamless, tubular fabric sleeve which is reinforced by a heat-activated thermal bonding material that is thermally secured to the inside of the backing of the tubular fabric sleeve.

The paint roller covers are manufactured from a seamless segment of tubular paint roller cover fabric that is placed onto a cylindrical forming tube having a segment of bonding material temporarily secured on its outer surface under the segment of tubular paint roller cover fabric. The cylindrical forming tube is placed on a heated mandrel to apply heat thereto to cause the bonding material to bond to the interior of the segment of tubular paint roller cover fabric. The cylindrical forming tube is removed from the mandrel and cooled, and the segment of tubular paint roller cover fabric becomes secured to the bonding material to produce a semi-rigid paint roller cover segment. The semi-rigid paint roller cover segment may be finished into paint roller covers by cutting it into appropriately sized segments, combing and shearing the pile fabric to a desired length, beveling the edges of the paint roller covers, and vacuuming stray fibers from the paint roller covers.

In a first embodiment, a paint roller cover includes: a segment of bonding material wound in a cylindrical configuration; and a segment of tubular paint roller fabric having an interior, a first end, and a second end, the segment of tubular paint roller fabric being located over the helically wound segment of bonding material; wherein the segment of bonding material is configured such that it is heat bonded to the interior of the segment of tubular paint roller fabric in a manner securing the segment of tubular paint roller fabric to the bonding material; and wherein the segment of bonding material is semi-rigid in a manner supporting the segment of tubular paint roller fabric thereupon.

In a second embodiment, a paint roller cover includes: a segment of bonding material helically wound in a cylindrical configuration; and a segment of tubular paint roller fabric located on the helically wound segment of bonding material; whereupon the helically wound segment of bonding material has been heated at a sufficient temperature for a sufficient period of time to cause the bonding material to bond to the interior of the segment of tubular paint roller fabric, and subsequently cooled to cause the segment of bonding material to become semi-rigid, the segment of tubular paint roller fabric being secured to the bonding material.

The pile fabric covered core assembly is finished by combing and shearing the pile fabric to the desired length. The edges of the unfinished paint roller covers are beveled, and any loose sliver fibers are then vacuumed off. The finishing of the pile fabric covered core assembly may be performed using the MBK Maschinenbau GmbH paint roller cover finishing machine, an Edward Jackson (Engineer) Limited finishing machine, or other equipment custom built by individual paint roller cover manufacturers.

It may therefore be seen that the present invention teaches a method by which a paint roller cover may be manufactured from tubular knitted pile fabric. Further, in practicing the paint roller cover manufacturing method of the present invention, the tubular knitted pile fabric need not be stretched, and no wrinkles or other surface defects are introduced into the tubular knitted pile fabric during the manufacturing process. Still further, the paint roller cover manufacturing method of the present invention, which manufactures the tubular knitted pile fabric with the pile side out, does not require the tubular knitted pile fabric to be inverted during the manufacturing process.

The paint roller cover manufacturing method of the present invention results in an acceptable pile which extends from an acceptably rigid core which can be installed on and used with any conventional paint roller frame, or on a frame uniquely designed for the paint roller utilizing the new core design. The paint roller cover manufacturing method of the present invention facilitates either the manufacture of a paint roller cover of a desired finished length, or the manufacture of an extended length segment from which segments of any desired size can be cut for finishing as paint roller covers, thereby facilitating the mass manufacture of paint roller covers. The paint roller cover manufacturing method of the present invention can use either tubular sliver knitted pile fabric or tubular knitted yarn cut pile fabric as well as a number of different backing materials.

The paint roller cover manufacturing method of the present invention results in a construction which is both durable and long lasting, and yields a paint roller cover of superior quality. The paint roller cover manufacturing method of the present invention also reduces the cost of manufacturing paint roller covers when compared to conventional methods of manufacturing paint roller covers by manufacturing paint rollers without using a core member, thereby affording it the broadest possible market. Finally, all of the aforesaid advantages and aspirations of the paint roller cover manufacturing method of the present invention are achieved without incurring any substantial relative disadvantage.

DESCRIPTION OF THE DRAWINGS

These and other advantages of the present invention are best understood with reference to the drawings, in which:

FIG. 3 is a schematic isometric depiction showing a segment of tubular paint roller cover fabric having an end thereof located adjacent to an end of a thin, hollow mounting tube;

FIG. 4 is a schematic isometric depiction showing the segment of tubular paint roller cover fabric shown in FIG. 3 as it is being pulled onto the outer surface of the mounting tube shown in FIG. 3;

FIG. 5 is a schematic isometric depiction showing the segment of tubular paint roller cover fabric shown in FIGS. 3 and 4 located on the outer surface of the mounting tube shown in FIGS. 3 and 4;

FIG. 6 is a schematic isometric depiction showing the segment of the mounting tube with the tubular paint roller cover fabric thereupon shown in FIG. 5 located adjacent to the aluminum heating tube having the helically wound bonding tape located thereupon shown in FIG. 2;

FIG. 7 is a schematic isometric depiction showing the mounting tube having the tubular paint roller cover fabric located thereupon as shown in FIGS. 5 and 6 as it is inserted onto the exterior of the aluminum heating tube having the helically wound bonding tape located thereupon shown in FIGS. 2 and 6;

FIG. 8 is a schematic isometric depiction of the mounting tube with the tubular paint roller cover fabric located thereupon as shown in FIG. 7 mounted over the aluminum heating tube having the helically wound bonding tape located thereupon as shown in FIG. 7;

FIG. 9 is a schematic isometric depiction of the elements shown in FIG. 7, showing an end of the tubular paint roller cover fabric being pulled off of the outer surface of the mounting tube and onto the helically wound bonding tape located on the aluminum heating tube as the aluminum heating tube having the helically wound bonding tape located thereupon is withdrawn from the interior of the mounting tube;

FIG. 16 is a schematic isometric depiction of the aluminum heating tube having the tubular paint roller cover fabric overlying the helically wound bonding tape shown in either of FIG. 10 or 12 being placed onto the mandrel heating assembly shown in FIG. 13;

FIG. 17 is a schematic isometric depiction of the aluminum heating tube having the tubular paint roller cover fabric overlying the helically wound bonding tape shown in FIG. 16 being heated by the mandrel heating assembly shown in FIG. 16;

FIG. 18 is a schematic isometric depiction of rollers pressing the tubular paint roller cover fabric onto the helically wound bonding tape on the heated aluminum heating tube on the mandrel heating assembly as shown in FIG. 17;

FIG. 19 is a schematic isometric depiction of the aluminum heating tube having the tubular paint roller cover fabric overlying the helically wound bonding tape shown in FIGS. 17 and 18 being removed from the mandrel heating assembly shown in FIGS. 17 and 18;

DETAILED DESCRIPTION OF THE EXEMPLARY EMBODIMENTS

Exemplary embodiments are discussed herein, it being understood that one skilled in the art could make any of a number of changes, modifications, variations, or alterations to the exemplary embodiments as described herein without departing from the spirit or scope of the present invention. The exemplary embodiments may utilize the tubular knitted pile fabric disclosed in the above-incorporated by reference U.S. Pat. No. 7,503,191, which discloses the tubular knitted pile fabric manufactured with the pile side facing outwardly and with a diameter suitable for mounting on a paint roller cover core. The tubular knitted pile fabric disclosed therein is a sliver knit fabric which uses fibers for the pile.

Alternately, a tubular knitted pile fabric using yarn as the pile component disclosed in U.S. Pat. No. 7,748,241, granted on Jul. 6, 2010, which patent is hereby incorporated herein by reference in its entirety, could be used as well. Another tubular knitted pile fabric that could instead be used is a hybrid tubular knitted pile fabric that uses both sliver fibers and yarn as the pile component and that is disclosed in U.S. Pat. No. 7,596,972, granted on Oct. 6, 2009, which patent is hereby incorporated herein by reference in its entirety. The exemplary embodiments taught herein each disclose how a segment of tubular knitted pile fabric may have its backing reinforced by thermally bonding a bonding tape into the backing of the segment of tubular knitted pile fabric, following which the tubular knitted pile fabric-covered core member may subsequently be finished in conventional fashion.

Figure 1:
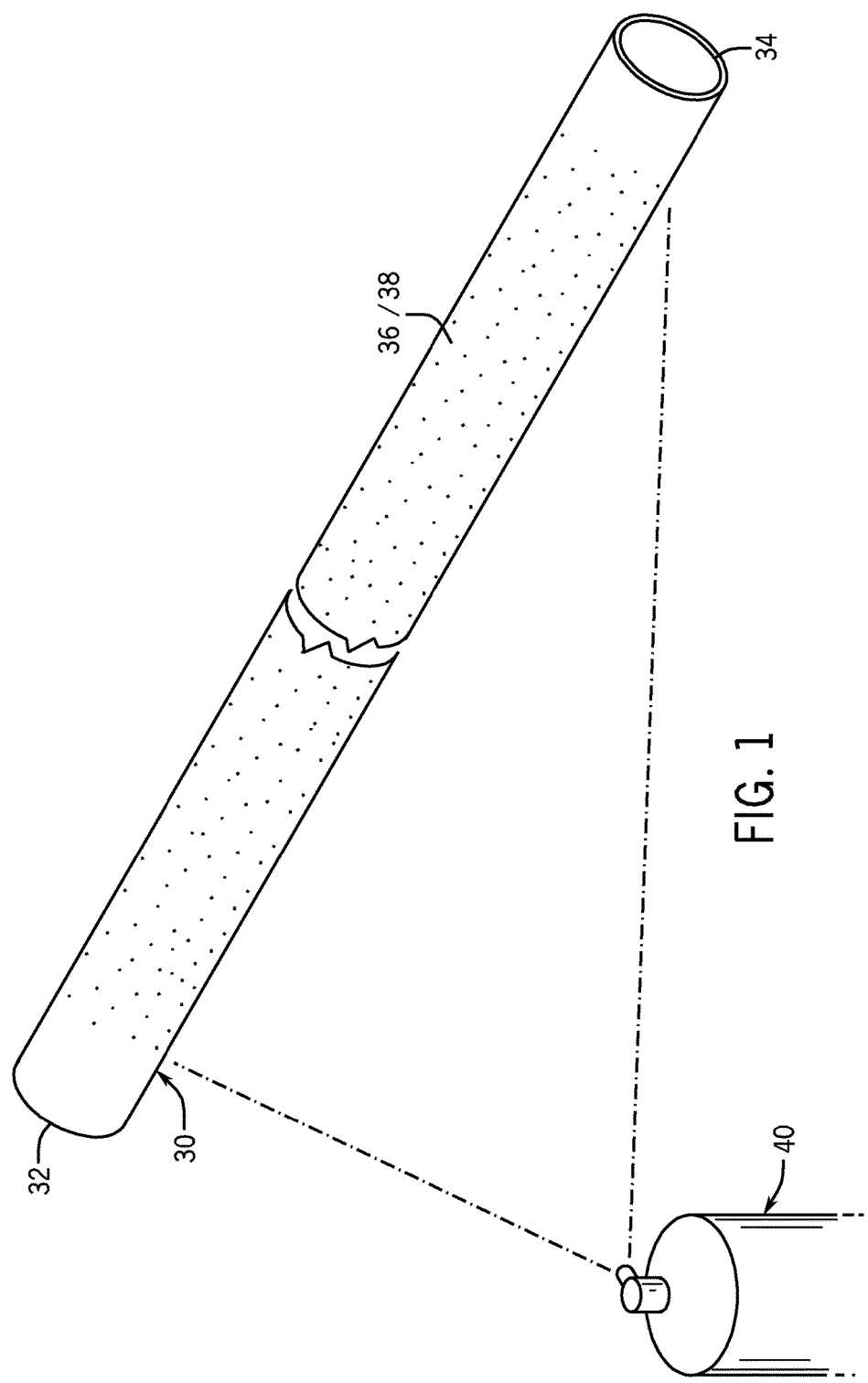
FIG. 1 is a schematic isometric depiction showing the optional application of a release agent onto the exterior surface of an aluminum heating tube.

Referring first to FIG. 1, a hollow cylindrical aluminum heating tube 30 having a first end 32 and a second end 34 is illustrated. The aluminum heating tube 30 has an outer diameter that is approximately the same as the inner diameter of a finished paint roller cover (paint roller covers typically have an inner diameter of approximately one and one-half inches (38 millimeters), although alternative sizes such as inner diameters of one and three-quarters inches (44 millimeters) and two inches (51 millimeters) can be manufactured as well). Optionally, but preferably, the aluminum heating tube 30 has a nonstick coating 36 of a low coefficient of friction material such as silicone or polytetrafluoroethylene (PTFE, such as the material marketed by DuPont under the trademark TEFLON) on the outer surface thereof. Alternately or additionally, and also optionally, but preferably, the aluminum heating tube 30 may have a release agent 38 such as Chem-Trend Pura 19037 Release Agent sprayed onto the outer surface thereof from a release agent dispenser 40, as shown in FIG. 1.

Since it is desirable to simultaneously manufacture more than a single standard length (nine inches (22.9 centimeters)) paint roller cover at a time, the aluminum heating tube 30 is preferably sufficiently long to accommodate the manufacture of an extended length paint roller core thereupon. For example, if seven nine-inch paint roller covers are to be manufactured from a single extended length segment of tubular paint roller cover fabric, the aluminum heating tube 30 would have to be somewhat longer than the segment of tubular paint roller cover fabric, which is for example at least approximately sixty-five to seventy inches (1.651 to 1.778 meters) long. Upon reading this specification, those skilled in the art will appreciate that the length of the aluminum heating tube 30 could vary considerably based upon manufacturing considerations, but would have to be at least approximately seventy-five to eighty inches (1.905 to 2.032 meters) long for a segment of tubular paint roller cover fabric sufficient to make seven nine-inch paint roller covers.

Figure 2:
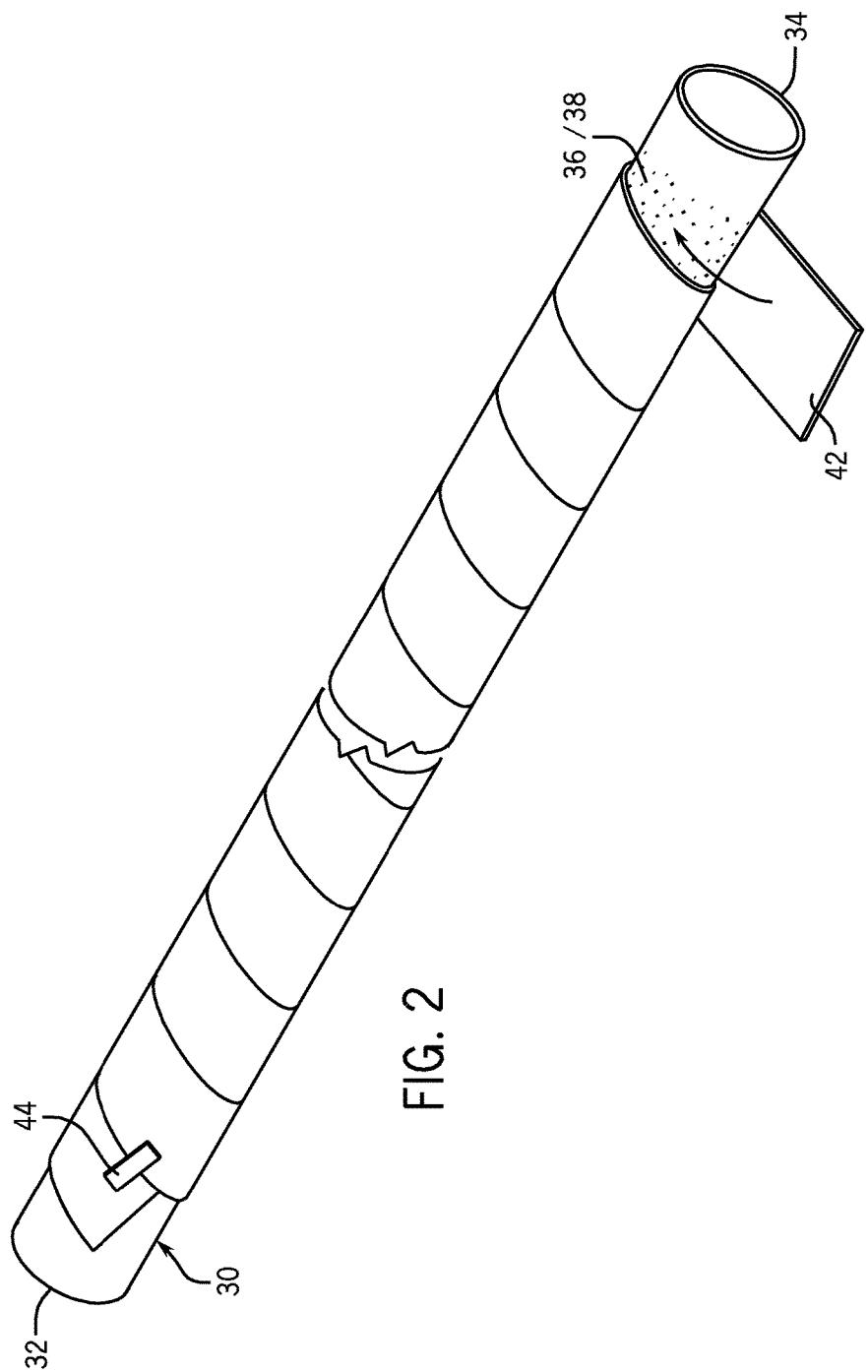
FIG. 2 is a schematic isometric depiction showing a segment of bonding tape being helically wound around the aluminum heating tube shown in FIG. 1 with the windings slightly overlapping each other.

Referring next to FIG. 2, a segment of thermal bonding material or bonding tape 42 is shown as it is helically wound around the aluminum heating tube 30. The bonding tape 42 is wound in overlapping windings as shown in FIG. 2, and each end of the bonding tape 42 may be secured with a strip of adhesive tape 44 to keep the windings intact on the aluminum heating tube 30. In a preferred embodiment, the bonding tape 42 may be approximately two and seven-eighths to three inches (7.303 to 7.62 centimeters) wide, and the windings may overlap by approximately one-eight to one-quarter inch (3.175 to 6.35 millimeters). Alternately, helical windings of other widths and/or other overlaps may instead be used, and a non-helical winding of full-width bonding tape could also be used, although it is more difficult to maintain in place on the aluminum heating tube 30.

Optionally, a helically wound strip (not shown in FIG. 2) of thin craft paper could be wound underneath the bonding tape 42 to prevent the bonding tape 42 from adhering to the surface of the aluminum heating tube 30 during a subsequent heating step.

Either one layer or multiple layers of the bonding tape 42 could be wound around the aluminum heating tube 30, with a single, helically wound, overlapping layer of the bonding tape 42 being the generally preferred embodiment. Unlike the dry adhesive film used in the "'050 application incorporated by reference above, the bonding tape 42 is preferably a film made of plastic material optionally having a reinforcement web located therein, and the bonding tape 42 does not have (or require) a non-tacky adhesive or a pressure-sensitive adhesive on either side thereof. Rather, the bonding aspect of the bonding tape 42 will be achieved in a thermal process which will melt the bonding tape 42 onto the inner diameter of a segment of tubular paint roller cover fabric located thereupon, as will become evident below.

The bonding tape 42 may be, for example, a heat-activated thermal bonding material in tape form such as, for example, three mil (0.0254 millimeter) Unitherm 0890 polyurethane film available from Unitherm Inc. in Dayton, Ohio, which is the currently preferred commercially available bonding tape 42. This material is available from Unitherm Inc. in thicknesses between two mil and five mil (0.0508 millimeter and 0.127 millimeter), and is available on either a paper or fabric carrier. Another heat-activated thermal bonding material in tape form that has been used is polyurethane film bonded to a support net, such as materials developed by Conweb Plastics, LLC in Minneapolis, Minn. These materials include product designations 20110311.AJT.001 and 20110311.AJT.004, which are respectively one mil and four mils (0.0254 millimeter and 0.1016 millimeter) thick polyurethane film bonded to Conwed's X04080 net.

Referring next to FIG. 3, a segment of tubular paint roller cover fabric 50 having a first end 52 and a second end 54 is shown as it is about to be pulled onto the exterior surface of a thin, hollow, longitudinally moveable mounting tube 56 having a first end 58 and a second end 60. The segment of tubular paint roller cover fabric 50 has an inner diameter that is approximately the same size as or slightly smaller than the outer diameter of the aluminum heating tube 30 (shown in FIGS. 1 and 2) upon which it will ultimately be installed.

For purposes of the example discussed herein, it will be assumed that the segment of tubular paint roller cover fabric 50 is approximately sixty-five to seventy inches (1.651 to 1.778 meters) long, which is a sufficient length to allow the segment of tubular paint roller cover fabric 50 to be used for the manufacture of seven nine-inch long paint roller covers. It will be appreciated by those skilled in the art that the segment of tubular paint roller cover fabric 50 could alternately be sized for use in manufacturing a single paint roller cover (nine-inches long or any other desired length as well), or for manufacturing any of several different numbers of paint roller covers of any of several different lengths.

Since the inner diameter of the mounting tube 56 needs to be sufficiently large to admit the aluminum heating tube 30 freely thereinto, for purposes of the example discussed herein, it will be assumed that the inner diameter of the mounting tube 56 is approximately one and three-quarters inches (the strip of adhesive tape 44.5 millimeters) and the outer diameter of the mounting tube 56 is approximately one and seven-eighths inches (48 millimeters). For the sixty-five to seventy inch (1.651 to 1.778 meters) long segment of tubular paint roller cover fabric 50, it will be appreciated that the mounting tube 56 will need to be sufficiently long to accommodate this length of segment of tubular paint roller cover fabric 50 (or any other desired length).

In FIG. 3, the segment of tubular paint roller cover fabric 50 is shown with its first end 52 about to be pulled over the first end 58 of the mounting tube 56. Since the inner diameter of the segment of tubular paint roller cover fabric 50 in the example presented herein is smaller than the outer diameter of the mounting tube 56 in the example presented herein, it will be appreciated by those skilled in the art that the segment of tubular paint roller cover fabric 50 will be stretched as it is pulled onto the outside of the mounting tube 56. FIG. 4 shows the segment of tubular paint roller cover fabric 50 partly pulled onto the mounting tube 56, and FIG. 5 shows the segment of tubular paint roller cover fabric 50 fully pulled onto the mounting tube 56, with the first end 52 of the segment of tubular paint roller cover fabric 50 located adjacent to the second end 60 of the mounting tube 56, and with the second end 54 of the segment of tubular paint roller cover fabric 50 located close adjacent to the first end 58 of the mounting tube 56.

Since the outer diameter of the mounting tube 56 is larger than the segment of tubular paint roller cover fabric 50, the segment of tubular paint roller cover fabric 50 must be manufactured in a manner whereby it is capable of stretching when it is pulled onto the mounting tube 56, and subsequently resiliently shrinking to its former size (or close thereto) when the segment of tubular paint roller cover fabric 50 is removed from the mounting tube 56 and installed onto the aluminum heating tube 30 (which installation is not shown in FIGS. 3 through 5). The segment of tubular paint roller cover fabric 50 taught in any of the above-incorporated by reference U.S. Pat. Nos. 7,503,191, 7,596,972, and 7,748,241 is resilient when stretched and will shrink to fit the outer diameter of a paint roller cover core.

FIGS. 6 through 10 schematically illustrate a method of installing the segment of tubular paint roller cover fabric 50 from the mounting tube 56 onto the aluminum heating tube 30 over the bonding tape 42. In the position shown in FIG. 6, the first end 32 of the aluminum heating tube 30 is about to be inserted into the interior of the first end 58 of the mounting tube 56. In FIG. 7, the first end 32 of the aluminum heating tube 30 is shown inserted approximately one-third of the way into the interior of the mounting tube 56 from the first end 58 thereof. In FIG. 8, the aluminum heating tube 30 having the bonding tape 42 thereupon is shown nearly fully inserted into the first end 58 of the mounting tube 56 such that the first end 32 of the aluminum heating tube 30 is located near to the second end 60 of the mounting tube 56.

Referring next to FIG. 9, the process of installing the segment of tubular paint roller cover fabric 50 onto the aluminum heating tube 30 is initiated by withdrawing the aluminum heating tube 30 from the mounting tube 56 while maintaining the segment of tubular paint roller cover fabric 50 stationary with respect to the aluminum heating tube 30. Those skilled in the art will immediately understand that this can done in one of two ways: first, by moving the mounting tube 56 to withdraw it from the segment of tubular paint roller cover fabric while maintaining the segment of tubular paint roller cover fabric 50 and the aluminum heating tube 30 stationary; or second, by simultaneously moving the segment of tubular paint roller cover fabric 50 and the aluminum heating tube 30 together away from the mounting tube 56 while maintaining the mounting tube 56 stationary. (It would also be possible to move the segment of tubular paint roller cover fabric 50 and the aluminum heating tube 30 together away from the mounting tube 56 while simultaneously moving the mounting tube 56 away from the segment of tubular paint roller cover fabric 50 and the aluminum heating tube 30.)

The method shown in FIGS. 8 and 9 uses the easiest of these alternative methods, namely longitudinally moving the mounting tube 56 to withdraw it from the segment of tubular paint roller cover fabric 50 while maintaining both the segment of tubular paint roller cover fabric 50 and the aluminum heating tube 30 stationary. The segment of tubular paint roller cover fabric 50 may, for example, be maintained in place with respect to the aluminum heating tube 30 through the use of clamps (not shown) or a similar mechanism to assist in pulling the segment of tubular paint roller cover fabric 50 off of the mounting tube 56.

In FIG. 9, it may be seen that the segment of tubular paint roller cover fabric 50 and the aluminum heating tube 30 are maintained in a stationary position as the mounting tube 56 is withdrawn from the segment of tubular paint roller cover fabric 50. In FIG. 9, the mounting tube 56 is about two-thirds of the way removed from the segment of tubular paint roller cover fabric 50. It may also be seen that as the mounting tube 56 is removed from the segment of tubular paint roller cover fabric 50, the segment of tubular paint roller cover fabric 50 shrinks to conform to the outer surface of the aluminum heating tube 30, causing the segment of tubular paint roller cover fabric 50 to be located on the helically wound bonding tape 42 on the outer surface of the aluminum heating tube 30.

Figure 11:
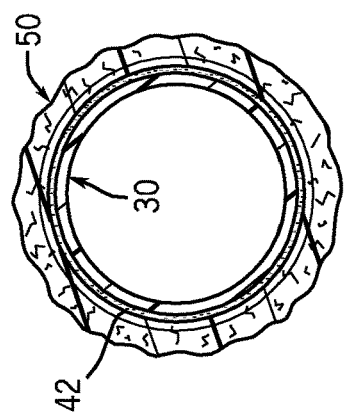
FIG. 11 is a cross-sectional depiction of the tubular paint roller cover fabric shown in FIG. 10 fully overlying the helically wound bonding tape located on the aluminum heating tube shown in FIG. 10.
Figure 10:
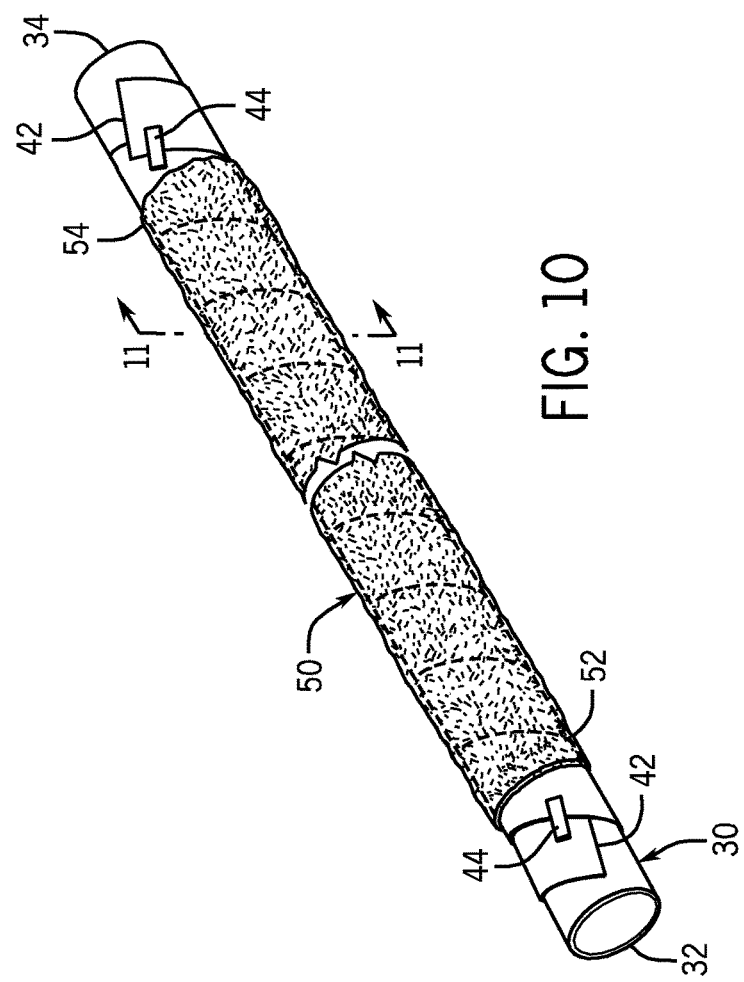
FIG. 10 is a schematic isometric depiction showing the tubular paint roller cover fabric mounted upon and covering most of the helically wound bonding tape located on the aluminum heating tube.

Referring next to FIG. 10, as the process continues, the mounting tube 56 has been completely withdrawn from the segment of tubular paint roller cover fabric 50 and is no longer shown, causing the entire length of the segment of tubular paint roller cover fabric 50 to conform to the outer surface of the aluminum heating tube 30 over the bonding tape 42. The segment of tubular paint roller cover fabric 50 has portions of the helically wound bonding tape 42 extending from both ends thereof, so it will be appreciated that the interior of the segment of tubular paint roller cover fabric 50 has the helically wound bonding tape 42 located thereunder, and does not directly contact the outer surface of the aluminum heating tube 30, as shown in the cross-sectional view of FIG. 11.

Optionally, during the process illustrated in FIGS. 6 through 10, a liquid adhesive may be used between the segment of tubular paint roller cover fabric 50 and the helically wound bonding tape 42 located thereunder. The liquid adhesive could be applied directly to the helically wound bonding tape 42, or it could instead be applied to the segment of tubular paint roller cover fabric 50 as it is removed from the mounting tube 56. This may be done by installing grooves in the outer surface of the mounting tube 56 and pumping the liquid adhesive through delivery channels in the mounting tube 56 to these grooves. As the segment of tubular paint roller cover fabric 50 is removed from the mounting tube 56 and installed onto the helically wound bonding tape 42 on the aluminum heating tube 30, the liquid adhesive is applied to the interior of the segment of tubular paint roller cover fabric 50 to further adhere it to the helically wound bonding tape 42. Adhesive numbers 3955, 3970, and 3945 from Fielco Adhesives which are 2-part epoxy adhesives may, for example, be used.

Figure 12:
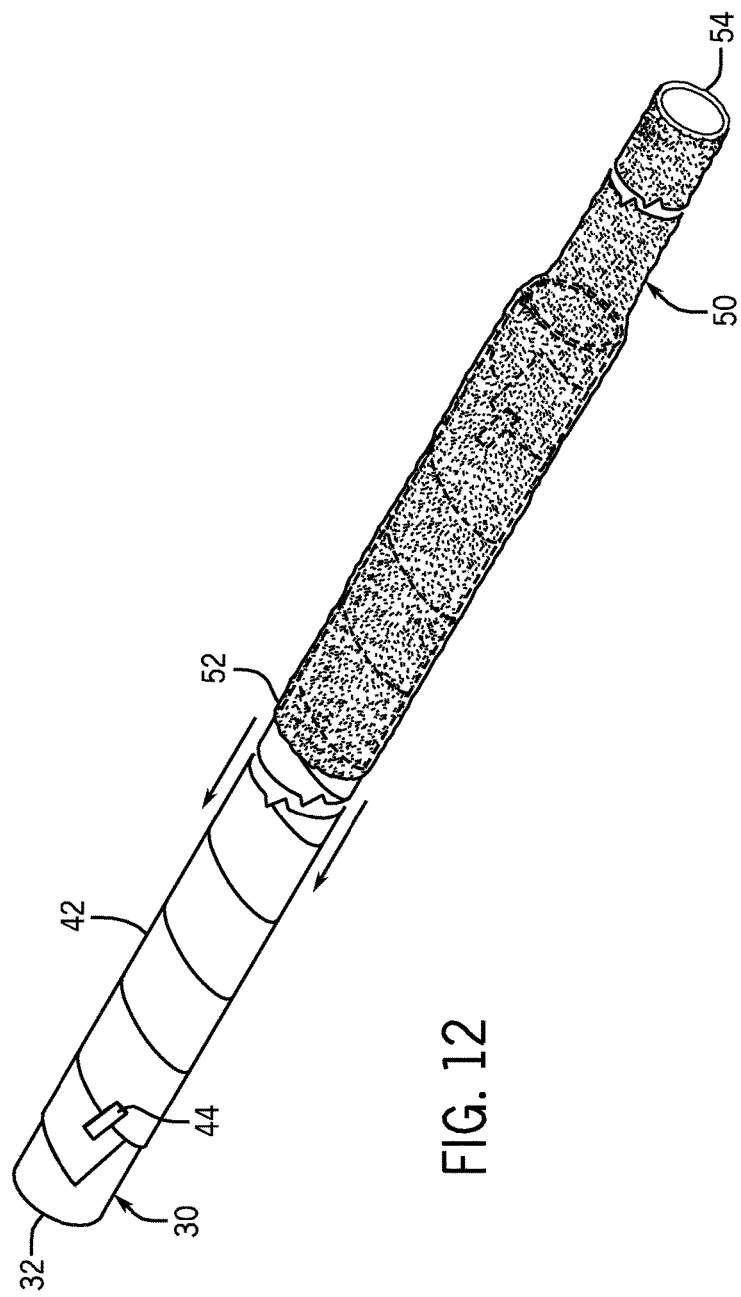
FIG. 12 is a schematic isometric depiction of an alternate method of placing a segment of tubular paint roller cover fabric onto the helically wound bonding tape located on the aluminum heating tube shown in FIG. 2 by directly pulling the tubular paint roller cover fabric onto the outer surface of the mounting tube and onto the aluminum heating tube and the helically wound bonding tape located thereupon.

Referring now to FIG. 12, an alternate method of placing the segment of tubular paint roller cover fabric 50 onto the helically wound bonding tape 42 wound on the aluminum heating tube 30 shown in FIG. 2 by directly pulling the segment of tubular paint roller cover fabric 50 onto the bonding tape 42 on the aluminum heating tube the aluminum heating tube 30. This method of installing the segment of tubular paint roller cover fabric 50 onto the bonding tape 42 on the aluminum heating tube 30 may be used so long as the windings of the bonding tape 42 are not disturbed such that a space between the windings places the segment of tubular paint roller cover fabric 50 into direct contact with the outer surface of the aluminum heating tube 30.

Figure 13:
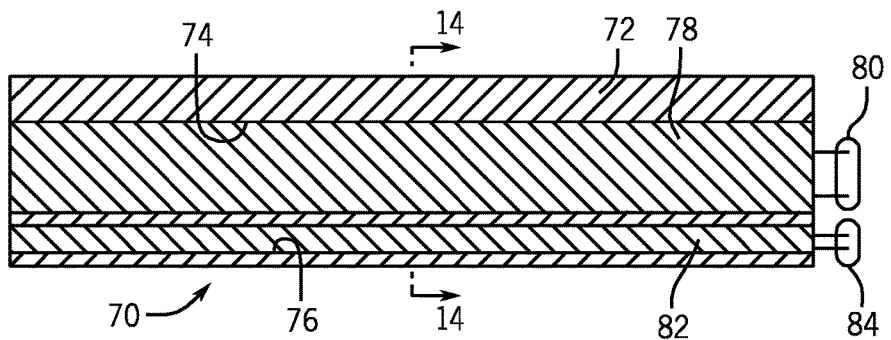
FIG. 13 is a longitudinal cross sectional view of a mandrel heating assembly having a cartridge heater and a thermocouple located inside a cylindrical mandrel.
Figure 14:
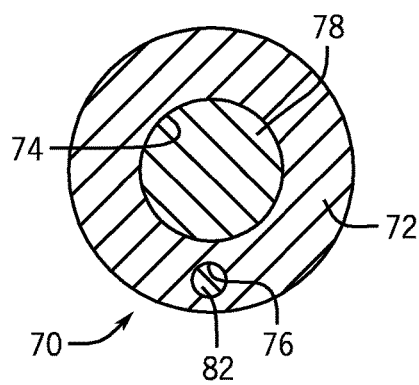
FIG. 14 is a lateral cross sectional view of the mandrel heating assembly shown in FIG. 13.

Referring now to FIGS. 13 and 14, an exemplary mandrel heating assembly 70 is illustrated in two cross-sectional views. The mandrel heating assembly 70 of the exemplary embodiment has a mandrel 72 that is cylindrical and has an outer diameter that is sized to allow the aluminum heating tube 30 (shown in FIG. 10) to be removably located thereupon, and may thus have an outer diameter of approximately one and three-eighths inches (35 millimeters) or slightly less. The mandrel 72 has a coaxial cylindrical aperture 74 located therein that is approximately three-quarters of an inch (19 millimeters) in diameter or slightly larger extending therethrough, which mandrel 72 may be made out of steel. A smaller aperture 76 that is approximately one-eighth of an inch (3.2 millimeters) is diameter or slightly larger extends longitudinally through the mandrel 72 and is located in the mandrel 72 between the aperture 74 and the outer surface of the mandrel 72.

A cartridge heater 78 is located in the aperture 74 in the mandrel 72. The cartridge heater may, for example, be a Watlow FIREROD Part No. N24A23-E12H cartridge heater from Watlow Electric Manufacturing Company of St. Louis, Mo. The cartridge heater 78 has a three-quarter inch (19 millimeter) diameter and is twenty-four inches (610 millimeters) long, has a 2750 Watt rating, and has two heater leads 80 extending from one end thereof.

A thermocouple 82 is located in the aperture 76 in the mandrel 72. The thermocouple 82 may be an Omega Model No. JMQSS-125G-6 thermocouple from Omega Engineering, Inc. of Stamford, Conn. The thermocouple 82 has a has an one-eighth inch (3.2 millimeter) diameter, is twenty-four inches (610 millimeters) long, and has two thermocouple leads 84 extending from one end thereof.

Figure 15:
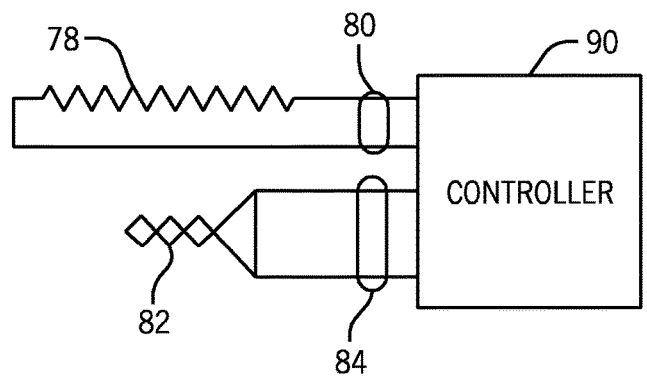
FIG. 15 is a schematic depiction of a controller that uses the signal from the thermocouple illustrated in FIG. 13 to control the cartridge heater also illustrated in FIG. 13.

Referring next to FIG. 15, a temperature controller 90 for operating the cartridge heater 78 based on temperature information received from the thermocouple 82 is illustrated. A Eurotherm Model No. 2216e general purpose PID (Proportional-Integral-Derivative) temperature controller 90 from Eurotherm Inc. of Leesburg, Va. has as an input the thermocouple leads 84 from the thermocouple 82, and is connected through the heater leads 80 to operate the cartridge heater 78 at the desired temperature.

Referring next to FIG. 16, the aluminum heating tube 30 with the bonding tape 42 and the segment of tubular paint roller cover fabric 50 located thereupon is shown as it is about to be placed onto the mandrel heating assembly 70. As mentioned above, the outer diameter of the mandrel 72 of the mandrel heating assembly 70 is sized to allow the inside diameter of the aluminum heating tube 30 to fit removably thereupon, but with a relatively close fit to allow heat from the mandrel heating assembly 70 to be transferred to and through the aluminum heating tube 30. Prior to placing the aluminum heating tube 30 with the bonding tape 42 and the segment of tubular paint roller cover fabric 50 located thereupon over the mandrel heating assembly 70, the mandrel heating assembly 70 is brought up to the desired temperature.

The temperature of the mandrel heating assembly 70 is a function of the material of the bonding tape 42 used. More specifically, the temperature used must be at or above the melting point of the bonding tape 42, but preferably below the melting point of the backing and the pile of the segment of tubular paint roller cover fabric 50. The temperature of the mandrel heating assembly 70 accordingly varies according to the properties of the bicomponent material. The range of the temperature of the mandrel heating assembly 70 is between approximately 300 degrees Fahrenheit (149 degrees Celsius) and approximately 450 degrees Fahrenheit (232 degrees Celsius). The preferred temperature is between approximately 335 degrees Fahrenheit (168 degrees Celsius) and approximately 375 degrees Fahrenheit (191 degrees Celsius). The most preferred temperature is approximately 360 degrees Fahrenheit (182 degrees Celsius).

In FIG. 16, the aluminum heating tube 30 with the bonding tape 42 and the segment of tubular paint roller cover fabric 50 located thereupon is shown with the second end 34 of the aluminum heating tube 30 about to be lowered onto the mandrel heating assembly 70. FIG. 17 shows the aluminum heating tube 30 with the bonding tape 42 and the segment of tubular paint roller cover fabric 50 located thereupon fully pulled onto the mandrel heating assembly 70, where it is heated and maintained for a period of time sufficient to activate the bonding tape 42. (Activating the bonding tape 42 constitutes melting it sufficiently to fuse it with the backing of the segment of tubular paint roller cover fabric 50 into an integral cylindrical configuration around the aluminum heating tube 30.) The range of this heating period of time is between approximately five seconds to approximately one-hundred twenty seconds for most bonding tape 42 materials, with the preferred time being between approximately fifteen seconds to approximately seventy seconds, and the most preferred time being approximately fifty seconds.

Turning next to FIG. 18, while the activation process of FIG. 17 is still ongoing, the aluminum heating tube 30 with the now-activated bonding tape 42 and the segment of tubular paint roller cover fabric 50 located thereupon remains on the mandrel heating assembly 70 and is subjected to a rolling process in which the segment of tubular paint roller cover fabric 50 is pressed into the bonding tape 42 on the aluminum heating tube 30. While this rolling process may be performed in a variety of ways, the exemplary manner in which it is performed in FIG. 18 is shown schematically through the use of three rollers 100, 102, and 104 which are rotatably supported on three roller support members 106, 108, and 110, respectively. The three rollers 100, 102, and 104 surround the mandrel heating assembly 70, and are mounted parallel to and are evenly spaced around the aluminum heating tube 30 on the mandrel heating assembly 70.

The three rollers 100, 102, and 104 apply pressure onto the outside of the segment of tubular paint roller cover fabric 50 to enhance the bond created by the activated bonding tape 42, and they are moved on the three roller support members 106, 108, and 110, respectively, around the aluminum heating tube 30 on the mandrel heating assembly 70 to press the segment of tubular paint roller cover fabric 50 into the bonding tape 42 and the outer surface of the aluminum heating tube 30. As the three rollers 100, 102, and 104 move, they will rotate about the three roller support members 106, 108, and 110, respectively, pressing radially inwardly on the segment of tubular paint roller cover fabric 50 and the activated bonding tape 42 with respect to the aluminum heating tube 30. This rolling process will ensure that that the activated bonding tape 42 will be fused with the backing of the segment of tubular paint roller cover fabric 50 into an integral cylindrical configuration around the aluminum heating tube 30.

The rolling process may be performed for a period of time having a range that is between approximately five seconds to approximately eighty seconds, with the preferred time being between approximately five seconds to approximately seventy seconds, and the most preferred time being approximately ten seconds. The pressure required during the rolling process is generally relatively small, and is not sufficient to cause the segment of tubular paint roller cover fabric 50 and the bonding tape 42 to slip rotationally with respect to the aluminum heating tube 30. After the rolling process is complete, the three rollers 100, 102, and 104 are removed from contact with the segment of tubular paint roller cover fabric 50.

Figure 20:
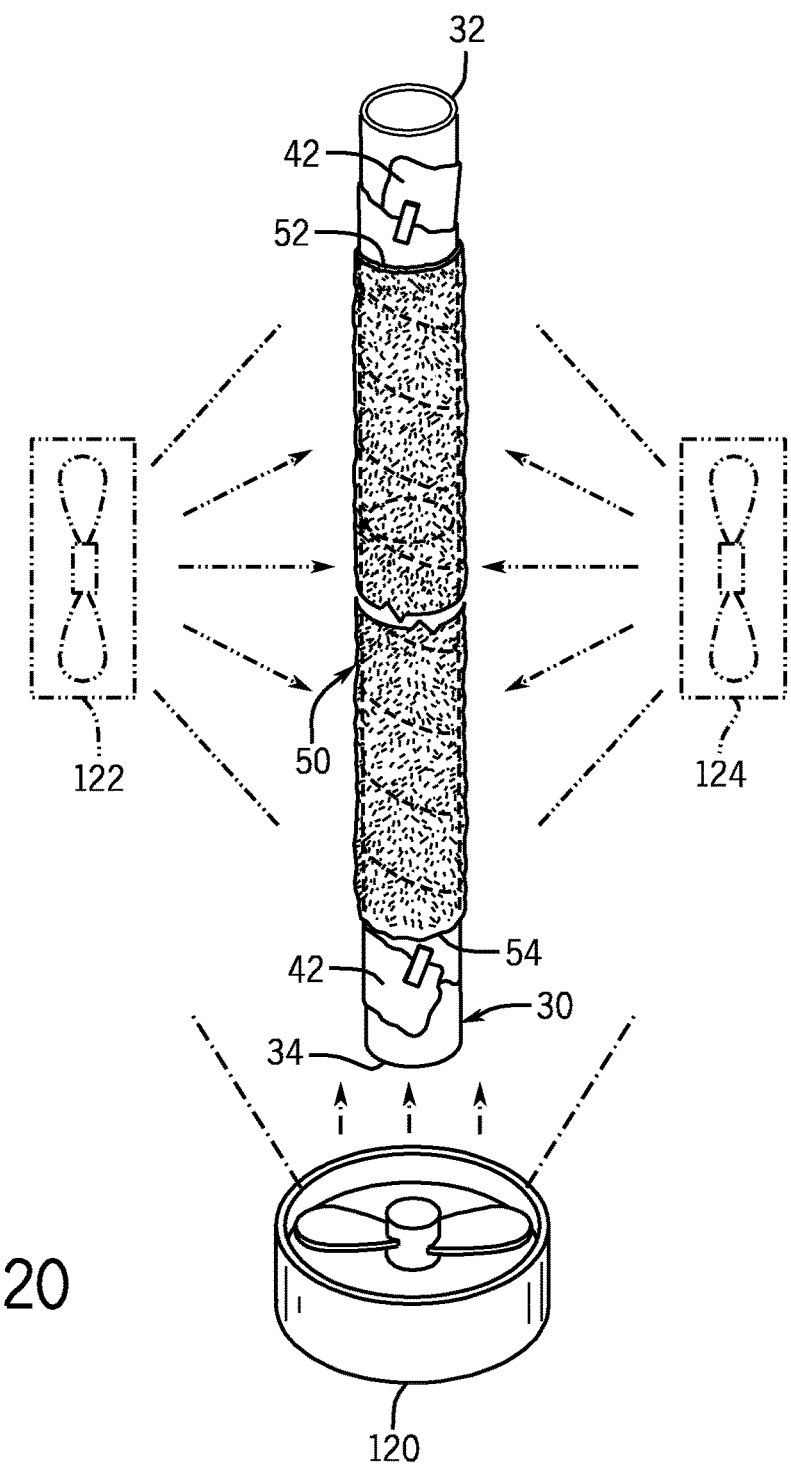
FIG. 20 is a schematic isometric depiction of a formed extended length tubular paint roller cover consisting of the helically wound bonding tape bonded to the interior of the tubular paint roller cover fabric after it is processed according to FIGS. 16 through 19 as a cooling airflow is provided to the interior of the heated aluminum heating tube and optionally to the outer surface of the tubular paint roller cover fabric.

Referring next to FIG. 19, the aluminum heating tube 30 having the segment of tubular paint roller cover fabric 50 and the activated bonding tape is removed from the mandrel 72 of the mandrel heating assembly 70. Next, as shown in FIG. 20 cooling air is supplied to the interior of the aluminum heating tube 30 by the fan 120, and optionally to the sides of the segment of tubular paint roller cover fabric 50 and the activated bonding tape 42 on the aluminum heating tube 30 by fans 122 and 124. In doing so, the temperature of the aluminum heating tube 30 and the activated bonding tape 42 on the aluminum heating tube 30 are reduced to make the material of the activated bonding tape 42 entirely solid. It will, however, have been thermally bonded to the inside surface of the backing of the segment of tubular paint roller cover fabric 50, in the process thereby forming a semi-rigid cylindrical inner surface surrounding the outer surface of the aluminum heating tube 30.

Figure 21:
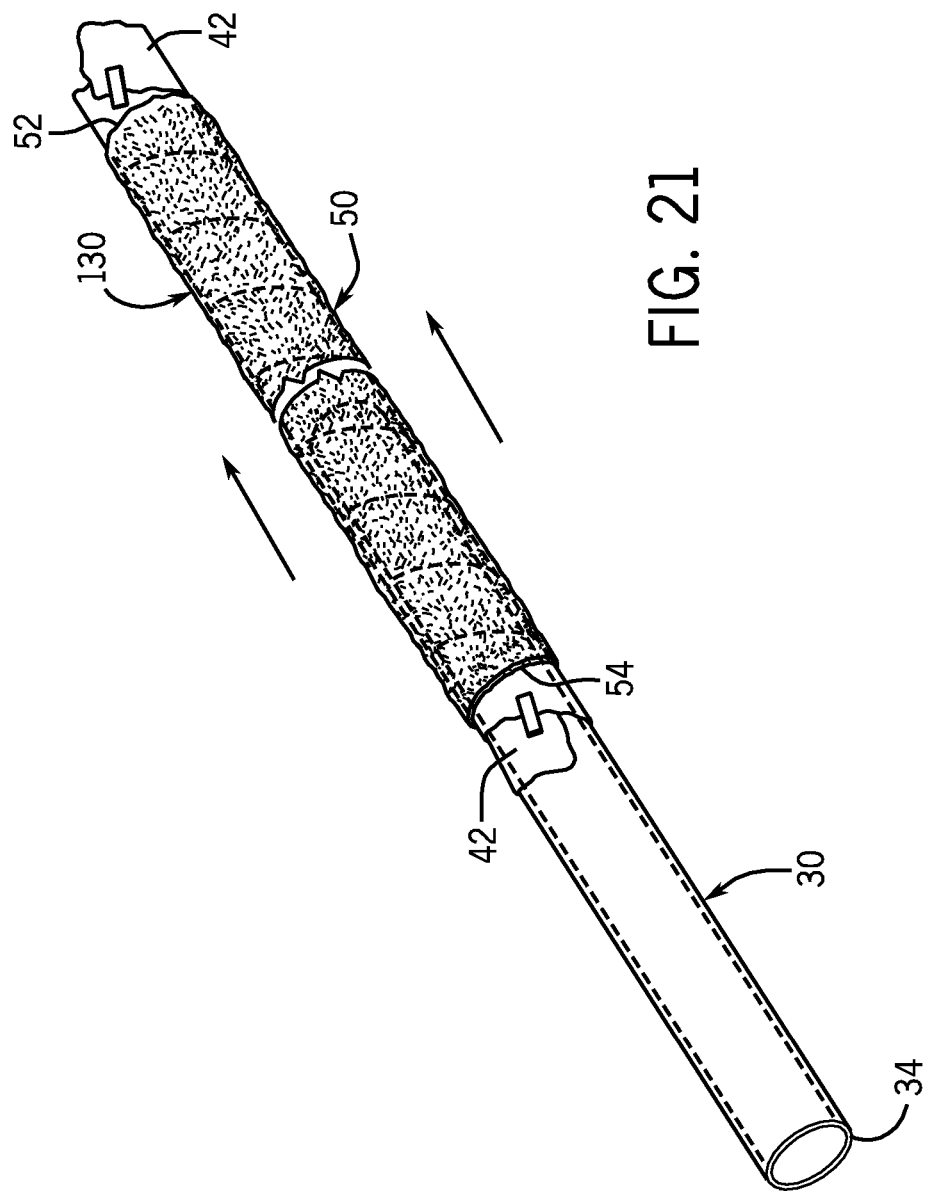
FIG. 21 is a schematic isometric depiction of the formed extended length tubular paint roller cover consisting of the tubular paint roller cover fabric having the helically wound bonding tape bonded to the interior thereof after it is processed according to FIGS. 16 through 20 as it is being removed from the aluminum heating tube after having been cooled in FIG. 20.
Figure 22:
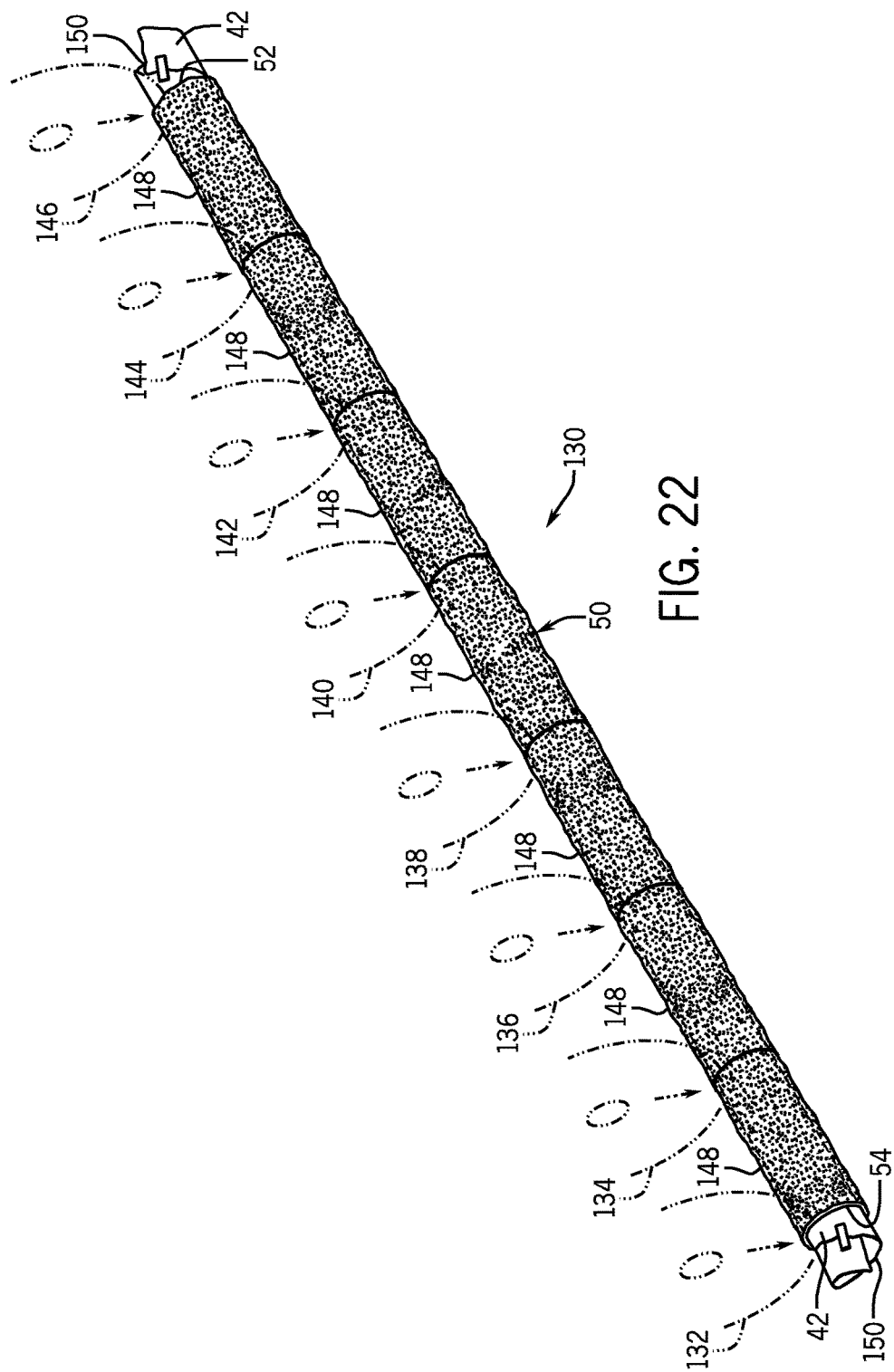
FIG. 22 is a schematic isometric depiction showing the formed extended length tubular paint roller cover shown in FIG. 21 having an extended length being cut into paint roller cover-size segments.

After the cooling process of FIG. 20, the segment of tubular paint roller cover fabric 50 and the now thermally bonded bonding tape 42 are removed from the aluminum heating tube 30, as shown in FIG. 21, by sliding them off of the aluminum heating tube 30. The assembly consisting of the segment of tubular paint roller cover fabric 50 and the now thermally bonded bonding tape 42 will be referred to as the pile fabric covered core assembly 130.

While FIGS. 16 though 19 depict the heating process being performed in a vertical orientation, with the mandrel heating assembly 70 in a vertical orientation and the aluminum heating tube 30 with the bonding tape 42 and the segment of tubular paint roller cover fabric 50 located thereupon also being in a vertical orientation as it is lowered onto the mandrel heating assembly 70, is should be noted that it could instead be performed in a horizontal orientation, with the mandrel heating assembly 70 in a horizontal orientation and the aluminum heating tube 30 with the bonding tape 42 and the segment of tubular paint roller cover fabric 50 located thereupon also being in a horizontal orientation that is slid onto the mandrel heating assembly 70.

The pile fabric covered core assembly 130 shown herein is approximately sixty-five to seventy inches (1.651 to 1.778 meters) long, and it can be cut into paint roller cover segments of any desired size. Eight cutting blades 132, 134, 136, 138, 140, 142, 144, and 146 are schematically shown (although a single cutting blade that moves in position with respect to the pile fabric covered core assembly 130 may be used instead) to cut the pile fabric covered core assembly 130 into seven nine inch (229 millimeter) long unfinished paint roller covers 148, with two short end pieces 150 being discarded. Alternatively, dual cutting blades mounted at angles can be used to simultaneously cut and bevel the edges of paint roller cover segments. The unfinished paint roller covers 148 will then be finished.

Finishing the unfinished paint roller covers 148 will include the steps of combing the pile of the knitted pile fabric on the unfinished paint roller covers 148 and shearing it to the desired length. Finally, the edges of the unfinished paint roller covers 148 are beveled, and any loose fibers are vacuumed off.

While the exemplary embodiment discussed produces a pile fabric covered core assembly 130 that is approximately sixty-five to seventy inches (1.651 to 1.778 meters) long, those skilled in the art will appreciate that it could instead be manufactured in other sizes as well, and thus could alternately be sized for use in manufacturing differing numbers of a plurality of paint roller covers in any of several different lengths.

An alternate embodiment of the paint roller cover manufacturing method of the present invention may use a segment of tubular paint roller cover fabric 50 that is manufactured with a base material that is made at least in part with a material having a lower melting point than the rest of the segment of tubular paint roller cover fabric 50. For example, the fabric disclosed in U.S. Pat. No. 6,766,668, which is assigned to the assignee of the present patent application, and which patent is hereby incorporated by reference herein in its entirety, may be used. This may further facilitate the integration of the backing of the segment of tubular paint roller cover fabric 50 with the helically wound segment of bonding tape 42 to form a semi-rigid interior of the pile fabric covered core assembly 130.

Figure 23:
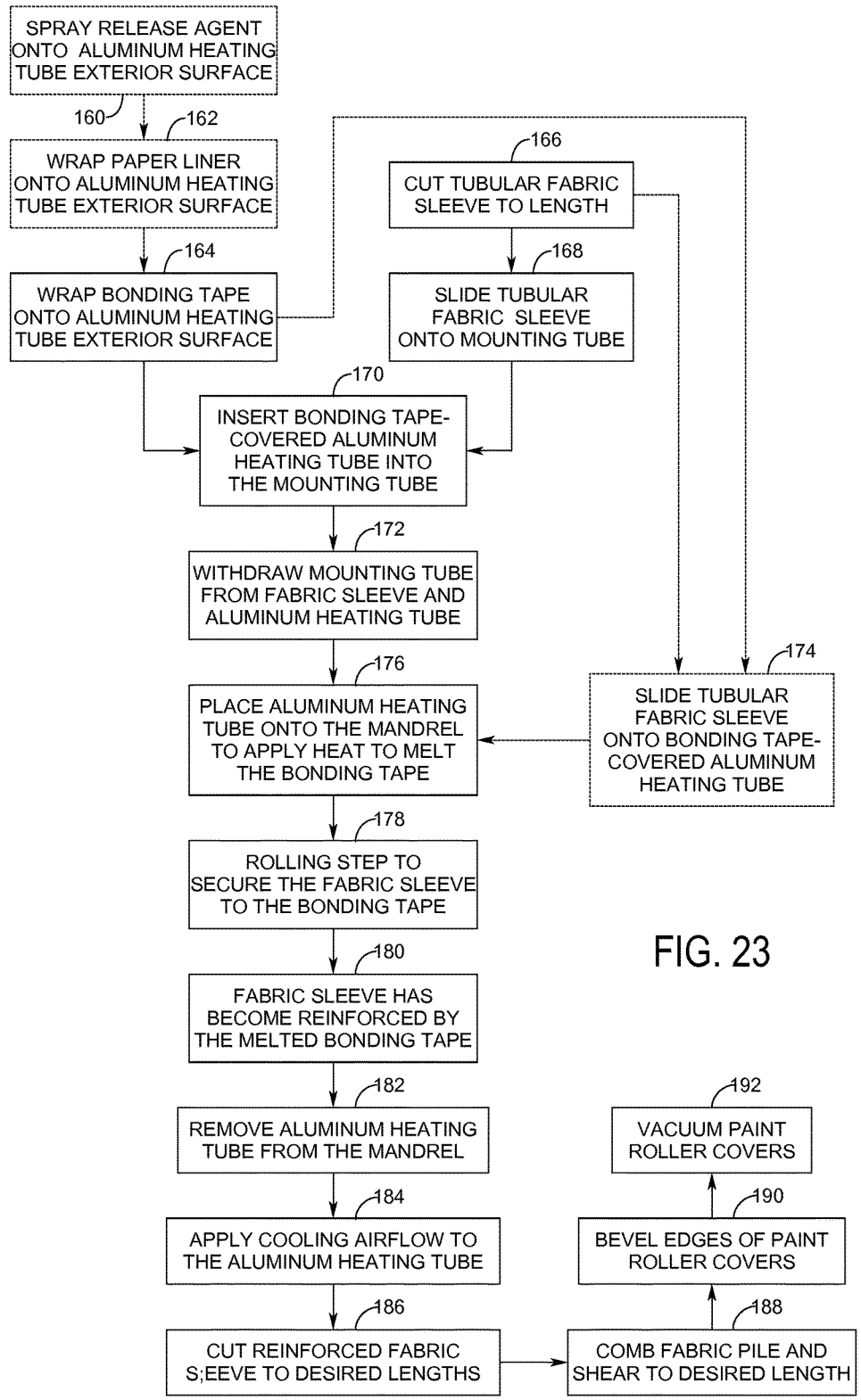
FIG. 23 is a flow diagram showing the manufacturing of a paint roller cover that is made according to the teachings of the present invention, with a number of the steps being those illustrated in FIGS. 1 through 20.

Referring finally to FIG. 23 (and also to other figures as referenced in passing below), the paint roller cover manufacturing method of the present invention is shown in a flow chart that includes a number of the variations discussed herein. The paint roller cover manufacturing method begins with an optional release spray step 160, in which the release agent 38 (shown in FIG. 1) is sprayed onto the outer surface of the aluminum heating tube 30 (also shown in FIG. 1).

Thus, the aluminum heating tube 30 may optionally have the nonstick coating 36 (also shown in FIG. 1) located thereupon, and may also optionally have the release agent 38 sprayed thereupon prior to each manufacturing cycle. Next, and also optionally, a strip of thin craft paper (not shown herein) may be helically wound onto the outer surface of the aluminum heating tube 30 in a wrap paper liner step 162.

The process next moves to a wrap bonding tape step 164, in which the bonding tape 42 is helically wound in overlapping fashion onto the outside surface of the aluminum heating tube 30, as shown in FIG. 2.

In a parallel cut tubular fabric sleeve to length step 166, a potentially very long segment of tubular knitted pile fabric is cut into the segment of tubular paint roller cover fabric 50 (shown in FIG. 3). The process next moves to a slide tubular fabric sleeve onto mounting tube step 168 in which the segment of tubular paint roller cover fabric 50 is pulled onto the mounting tube 56 (as shown in FIGS. 3 through 5).

From the wrap bonding tape step 164 and the slide tubular fabric sleeve onto mounting tube step 168, the process then moves to an insert bonding tape-covered heating tube into mounting tube step 170 (as shown in FIGS. 6 and 7) in which the aluminum heating tube 30 having the bonding tape 42 helically wound thereupon is inserted into the interior of the second end 60 of the mounting tube 56, which has the segment of tubular paint roller cover fabric 50 located thereupon.

The process next moves to a withdraw mounting tube from fabric sleeve and aluminum heating tube step 172 (shown in FIG. 9) in which the mounting tube 56 is withdrawn from the segment of tubular paint roller cover fabric 50 and the aluminum heating tube having the bonding tape 42 thereupon while maintaining the segment of tubular paint roller cover fabric 50 and the aluminum heating tube 30 stationary with respect to each other. This results in the segment of tubular paint roller cover fabric 50 shrinking to conform to the outer surface of the aluminum heating tube 30 over the bonding tape 42 thereupon.

The optional alternate method of installing the segment of tubular paint roller cover fabric 50 onto the aluminum heating tube 30 having the bonding tape 42 thereupon is shown in an optional slide tubular fabric sleeve onto bonding tape-covered heating tube step 174. This optional alternate method is shown in FIG. 12.

Following performing one of the withdraw mounting tube from fabric sleeve and aluminum heating tube step 172 and the slide tubular fabric sleeve onto bonding tape-covered heating tube step 174, the process next moves to a place aluminum heating tube onto mandrel step 176, in which the aluminum heating tube 30 with the aluminum heating tube 30 and the bonding tape 42 located thereupon is placed onto the mandrel 72 of the mandrel heating assembly 70 to initiate the heating process, as shown in FIG. 16. It will be understood by those skilled in the art that the mandrel 72 is preheated to the desired predetermined temperature. The aluminum heating tube with the segment of tubular paint roller cover fabric 50 and the bonding tape 42 located thereupon is heated on the mandrel 72 for a predetermined time as shown in FIG. 17 for the predetermined time to cause the bonding tape 42 to melt into the backing of the segment of tubular paint roller cover fabric 50.

Next, the process moves to a rolling step 178 in which the segment of tubular paint roller cover fabric 50 is pressed into the melting bonding tape 42 on the aluminum heating tube 30 to enhance the bond created by the melting bonding tape 42 to the segment of tubular paint roller cover fabric 50, as illustrated by a fabric sleeve reinforcement step 180 and as shown in FIG. 18. This ensures that that the activated bonding tape 42 will be fused with the backing of the segment of tubular paint roller cover fabric 50 into an integral cylindrical configuration around the aluminum heating tube 30.

The process then moves to a remove aluminum heating tube from mandrel step 182 in which the aluminum heating tube 30 with the segment of tubular paint roller cover fabric 50 and the heat-activated bonding tape 42 (shown in FIG. 19) is removed from the mandrel 72. At this point, while the aluminum heating tube 30, the segment of tubular paint roller cover fabric 50, and the heat-activated bonding tape 42 will cool gradually, it is preferable to perform an apply cooling airflow step 184 to more quickly cool the aluminum heating tube 30, the segment of tubular paint roller cover fabric 50, and the heat-activated bonding tape 42, as shown in FIG. 20, after which the pile fabric covered core assembly 130 can be removed from the aluminum heating tube 30 as shown in FIG. 21.

Next, in an optional cut fabric-covered core member to desired lengths step 186, the pile fabric covered core assembly 130 may be cut into a plurality of unfinished paint roller covers 148 of any desired size. This step is, of course, not performed if the segment of tubular paint roller cover fabric 50 was cut to meet its finished size in the cut tubular fabric sleeve to length step 186. The unfinished paint roller covers 148 may then have the fabric pile thereupon combed and sheared to a desired length in a comb and shear fabric pile step 188. It should be noted that the comb and shear fabric pile step 188 may instead be performed before the cut fabric-covered core member to desired lengths step 186.

Next, in a bevel edges of paint roller covers step 190, the edges of the unfinished paint roller covers 148 are beveled to finish them. Finally, in a vacuum paint roller covers step 192, loose fibers are vacuumed off the unfinished paint roller covers, finishing them into paint roller covers which may then be packaged and sold (typically, vacuuming is accomplished throughout the brushing, shearing, and beveling steps rather than as a separate step).

It may therefore be appreciated from the above detailed description of the preferred embodiment of the present invention that it teaches a method by which a paint roller cover may be manufactured from tubular knitted pile fabric. Further, in practicing the paint roller cover manufacturing method of the present invention, the tubular knitted pile fabric need not be stretched, and no wrinkles or other surface defects are introduced into the tubular knitted pile fabric during the manufacturing process. Still further, the paint roller cover manufacturing method of the present invention, which manufactures the tubular knitted pile fabric with the pile side out, does not require the tubular knitted pile fabric to be inverted during the manufacturing process.

The paint roller cover manufacturing method of the present invention results in an acceptable pile which extends from an acceptably rigid core which can be installed on and used with any conventional paint roller frame, or on a frame uniquely designed for the paint roller utilizing the new core design. The paint roller cover manufacturing method of the present invention facilitates either the manufacture of a paint roller cover of a desired finished length, or the manufacture of an extended length segment from which segments of any desired size can be cut for finishing as paint roller covers, thereby facilitating the mass manufacture of paint roller covers. The paint roller cover manufacturing method of the present invention can use either tubular sliver knitted pile fabric or tubular knitted yarn cut pile fabric as well as a number of different backing materials.

The paint roller cover manufacturing method of the present invention results in a construction which is both durable and long lasting, and yields a paint roller cover of superior quality. The paint roller cover manufacturing method of the present invention also reduces the cost of manufacturing paint roller covers when compared to conventional methods of manufacturing paint roller covers by manufacturing paint rollers without using a core member, thereby affording it the broadest possible market. Finally, all of the aforesaid advantages and aspirations of the paint roller cover manufacturing method of the present invention are achieved without incurring any substantial relative disadvantage.

Although the foregoing description of the paint roller cover manufacturing method of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A paint roller cover, comprising:
   a segment of bonding material wound in a cylindrical configuration; and
   a segment of tubular paint roller fabric having an interior, a first end, and a second end, the segment of tubular paint roller fabric being located over the segment of bonding material;
   wherein the segment of bonding material is configured such that it is heat bonded to the interior of the segment of tubular paint roller fabric in a manner securing the segment of tubular paint roller fabric to the bonding material; and
   wherein the segment of bonding material is semi-rigid in a manner supporting the segment of tubular paint roller fabric thereupon; and
   wherein the segment of tubular paint roller fabric comprises pile strands knitted into a backing fabric, and wherein the backing fabric comprises at least one bicomponent fiber comprising:
      a first material having a first melting point; and
      a second material having a second melting point that is lower than said first melting point.

2. A paint roller cover as defined in claim 1, wherein the bonding material comprises:
   a segment of thermally activatable bonding tape wound in helical windings into a cylindrical formation.

3. A paint roller cover as defined in claim 2, wherein the helical windings overlap.

4. A paint roller cover as defined in claim 2, wherein the thermally activatable bonding tape comprises:
   a polyurethane film material.

5. A paint roller cover as defined in claim 4, wherein the polyurethane film material is reinforced with a support netting material.

6. A paint roller cover as defined in claim 1, wherein the segment of tubular paint roller fabric comprises:
   a sliver knit tubular knitted pile fabric wherein the pile strands comprise tufts of sliver fibers.

7. A paint roller cover as defined in claim 1, wherein the segment of tubular paint roller fabric comprises:
   a knit tubular knitted cut pile fabric wherein the pile strands comprise cut pile segments.

8. A paint roller cover as defined in claim 1, wherein the segment of tubular paint roller fabric is substantially longer than the length of a paint roller cover.

9. A paint roller cover as defined in claim 1, wherein said bonding material has been melted onto the interior of the segment of tubular paint roller fabric.

10. A paint roller cover as defined in claim 1, wherein the segment of tubular paint roller fabric has a pile side and a backing side which is opposite said pile side, and wherein the segment of tubular paint roller fabric is manufactured and provided with its pile side out.

11. A paint roller cover as defined in claim 1, wherein the segment of tubular paint roller fabric is substantially longer than the length of a paint roller cover.

12. A paint roller cover as defined in claim 1, additionally comprising:
    a cylindrical segment of paper, wherein the segment of bonding material is located intermediate the segment of paper and the segment of tubular paint roller fabric.

13. A paint roller cover, comprising:
    a segment of bonding material helically wound in a cylindrical configuration; and
    a segment of tubular paint roller fabric located on the helically wound segment of bonding material;
    whereupon the helically wound segment of bonding material has been heated at a sufficient temperature for a sufficient period of time to cause the bonding material to bond to the interior of the segment of tubular paint roller fabric, and subsequently cooled to cause the segment of bonding material to become semi-rigid, the segment of tubular paint roller fabric being secured to the bonding material; and
    wherein the bonding material comprises:
    a segment of thermally activatable bonding tape; and
    wherein the thermally activatable bonding tape comprises:
       a polyurethane film material.

14. A paint roller cover as defined in claim 13, wherein the helical windings of the thermally activatable bonding tape overlap.

15. A paint roller cover as defined in claim 13, wherein the segment of tubular paint roller fabric comprises either:
    a sliver knit tubular knitted pile fabric wherein the pile strands comprise tufts of sliver fibers; or
    a knit tubular knitted cut pile fabric wherein the pile strands comprise cut pile segments.

16. A paint roller cover as defined in claim 13, wherein the segment of tubular paint roller fabric comprises pile strands knitted into a backing fabric, and wherein the backing fabric comprises at least one bicomponent fiber comprising:
    a first material having a first melting point; and
    a second material having a second melting point that is lower than said first melting point.

17. A paint roller cover as defined in claim 13, wherein said bonding material has been melted onto the interior of the segment of tubular paint roller fabric.

18. A paint roller cover as defined in claim 13, wherein the segment of tubular paint roller fabric has a pile side and a backing side which is opposite said pile side, and wherein the segment of tubular paint roller fabric is manufactured and provided with its pile side out.

19. A paint roller cover as defined in claim 13, wherein the polyurethane film material is reinforced with a support netting material.

* * * * *